United States Patent
Zacarese et al.

(10) Patent No.: US 10,771,746 B2
(45) Date of Patent: Sep. 8, 2020

(54) SYSTEM AND METHOD FOR SYNCHRONIZING CAMERA FOOTAGE FROM A PLURALITY OF CAMERAS IN CANVASSING A SCENE

(71) Applicant: PROBABLE CAUSE SOLUTIONS LLC, Wantagh, NY (US)

(72) Inventors: Richard Zacarese, Wantagh, NY (US); Edward T. Rourke, Cornwall, NY (US); Kevin T. Catalina, Sayville, NY (US)

(73) Assignee: Probable Cause Solutions LLC, Wantagh, NY (US)

( * ) Notice: Subject to any disclaimer, the term of this patent is extended or adjusted under 35 U.S.C. 154(b) by 0 days.

(21) Appl. No.: 16/666,532

(22) Filed: Oct. 29, 2019

(65) Prior Publication Data

US 2020/0068176 A1 Feb. 27, 2020

Related U.S. Application Data

(63) Continuation of application No. 15/493,425, filed on Apr. 21, 2017, now Pat. No. 10,499,016.
(Continued)

(51) Int. Cl.
*H04N 7/18* (2006.01)
*H04N 5/77* (2006.01)
(Continued)

(52) U.S. Cl.
CPC ............ *H04N 7/181* (2013.01); *G06F 16/71* (2019.01); *G06F 16/743* (2019.01);
(Continued)

(58) Field of Classification Search
CPC combination set(s) only.
See application file for complete search history.

(56) References Cited

U.S. PATENT DOCUMENTS

| 6,144,375 | A  | * | 11/2000 | Jain .................. G11B 27/105 |
| | | | | 715/251 |
| 8,811,793 | B2 | * | 8/2014 | Squyres ................ H04N 5/77 |
| | | | | 386/224 |
| 9,621,768 | B1 | * | 4/2017 | Lyon .................... H04N 5/00 |
| 2003/0100326 | A1 | | 5/2003 | Grube |
| 2006/0171453 | A1 | * | 8/2006 | Rohlfing .......... G08B 13/19656 |
| | | | | 375/240.01 |

(Continued)

OTHER PUBLICATIONS

Ace, Ethan "Resolving IP Camera/VMS Time Sync Problems", IPVM, Nov. 7, 2011 (YR: 2011).

*Primary Examiner* — Fabio S Lima
*Assistant Examiner* — Michael Robert Cammarata
(74) *Attorney, Agent, or Firm* — Betsy Kingbury Dowd, Esq; BKDowd Law, P.C.

(57) ABSTRACT

A method and system for synchronizing camera footage from a plurality of cameras includes providing a database of cameras, accessible via a user device, which stores a correction associated with each camera to a date/time in metadata associated with footage recorded by the camera, to facilitate synchronization of footage recorded by each camera to an actual date/time. The stored correction is applied to camera(s) to determine an adjusted date/time in the metadata corresponding to footage recorded at a particular date and time; and the footage for the camera(s) is synchronized to the particular date and time, based on the adjusted date/time determined from the correction. Cameras for synchronization are identified based on location stored in the database. A list of identified cameras may be exported with a case or UserID, and locations, adjusted metadata for synchronization, and bases for the correction calculation. The list is optionally generated via mapping functions.

20 Claims, 22 Drawing Sheets

Related U.S. Application Data

(60) Provisional application No. 62/325,731, filed on Apr. 21, 2016.

(51) Int. Cl.

| | | |
|---|---|---|
| *G06T 11/60* | (2006.01) | |
| *G11B 27/10* | (2006.01) | |
| *G06F 16/71* | (2019.01) | |
| *G06F 16/74* | (2019.01) | |
| *G06F 16/78* | (2019.01) | |
| *G06T 11/20* | (2006.01) | |
| *G06T 11/00* | (2006.01) | |
| *G06F 3/0486* | (2013.01) | |
| *G06F 3/0484* | (2013.01) | |
| *G06F 3/0482* | (2013.01) | |
| *G06Q 50/26* | (2012.01) | |

(52) U.S. Cl.
CPC ........ *G06F 16/7867* (2019.01); *G06T 11/206* (2013.01); *G06T 11/60* (2013.01); *G11B 27/10* (2013.01); *H04N 5/77* (2013.01); *G06F 3/0482* (2013.01); *G06F 3/0486* (2013.01); *G06F 3/04842* (2013.01); *G06Q 50/26* (2013.01)

(56) References Cited

U.S. PATENT DOCUMENTS

| | | | |
|---|---|---|---|
| 2008/0060034 A1* | 3/2008 | Egnal | G03B 15/006 725/105 |
| 2009/0015672 A1 | 1/2009 | Clapp | |
| 2011/0018998 A1* | 1/2011 | Guzik | G06K 9/00221 348/143 |
| 2014/0313341 A1* | 10/2014 | Stribling | H04N 21/2743 348/157 |
| 2014/0368601 A1 | 12/2014 | deCharms | |
| 2015/0168144 A1 | 6/2015 | Barton | |
| 2015/0264296 A1 | 9/2015 | Devaux | |
| 2017/0155791 A1 | 6/2017 | Millikan | |
| 2017/0214843 A1* | 7/2017 | Boykin | H04N 5/23203 |
| 2017/0251231 A1* | 8/2017 | Fullerton | H04N 21/8547 |
| 2017/0295464 A1 | 10/2017 | Mottur | |

\* cited by examiner

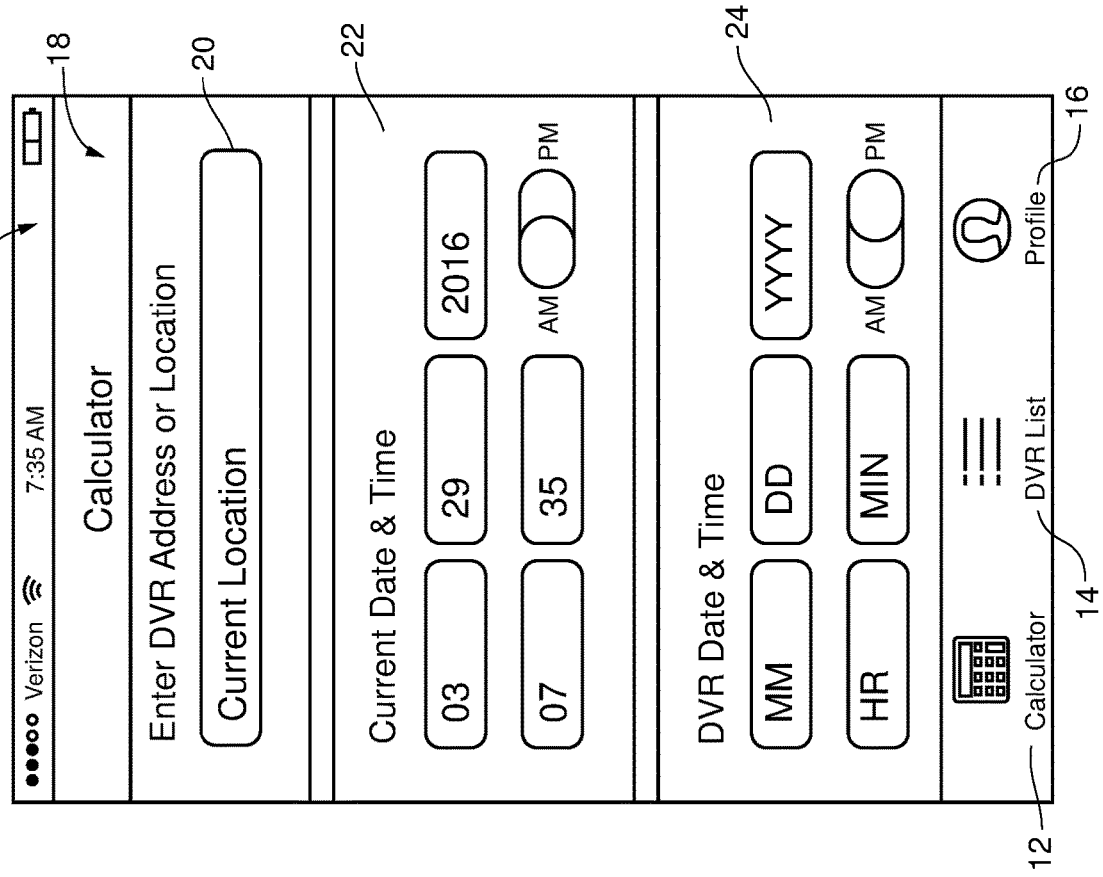

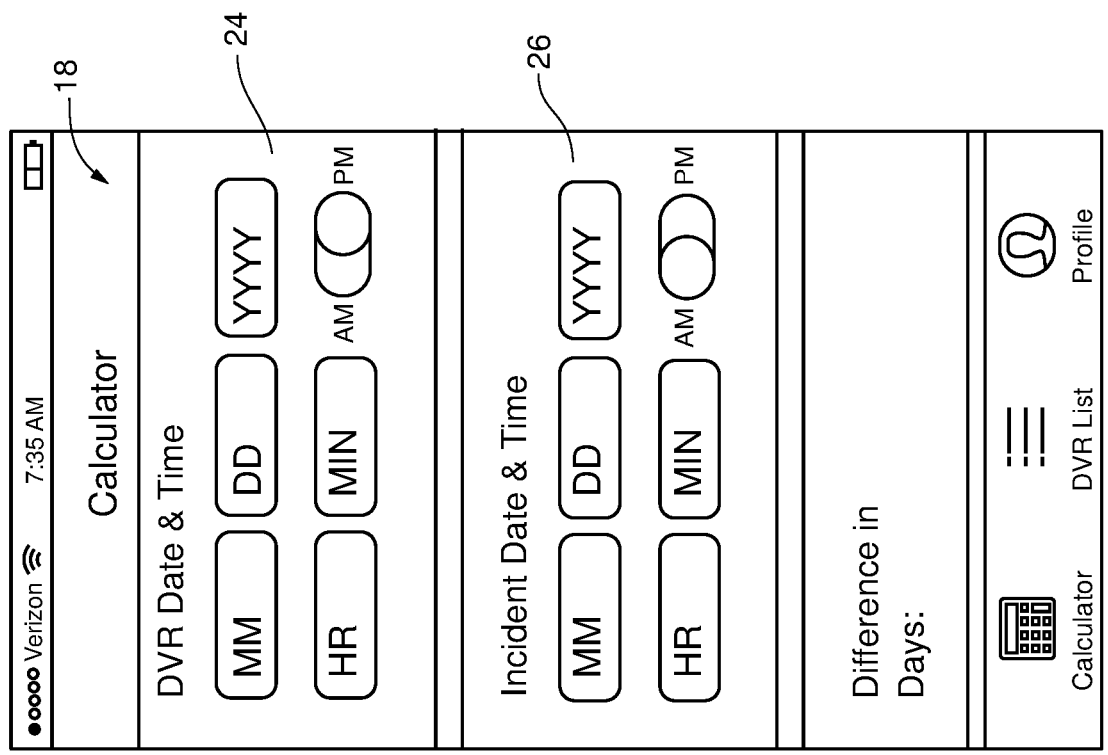

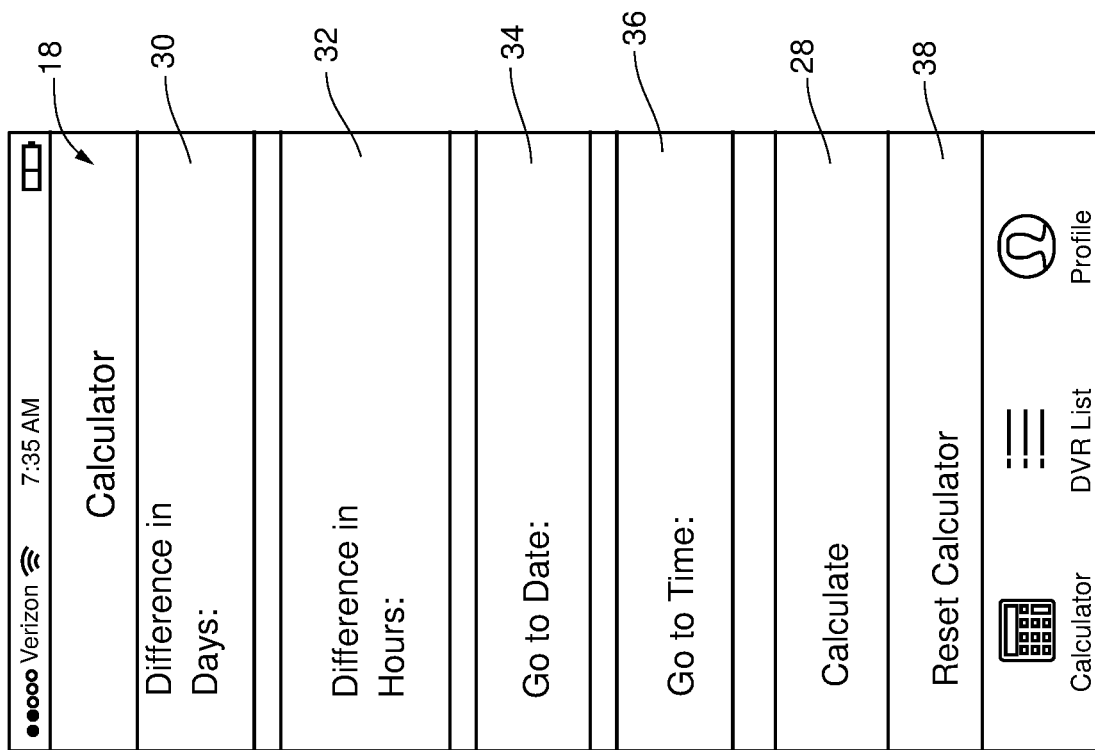

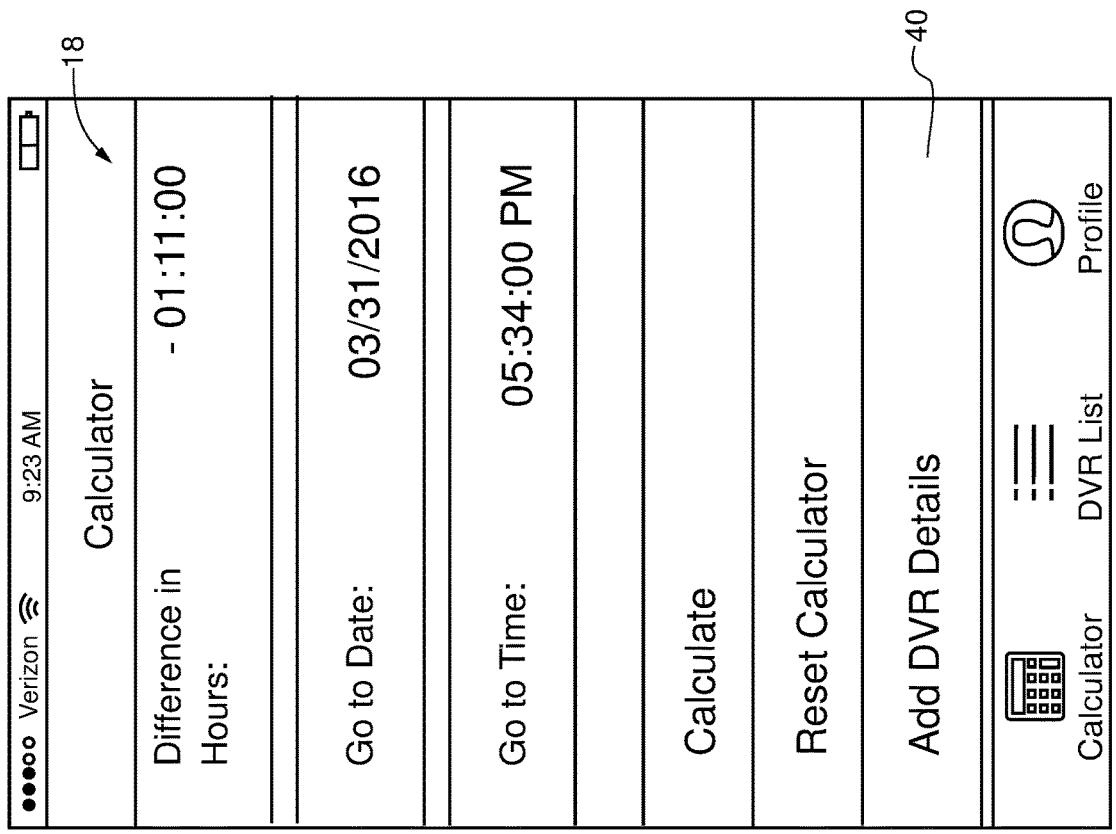

*FIG. 6A*

- Cancel  DVR Details  Done
- LOCATION INFORMATION
- Location Name
- Address
- City
- State | ZIP
- Phone
- CONTACT INFORMATION
- Contact Name
- Calculator | DVR List | Profile

*FIG. 6B*

- Cancel  DVR Details  Done
- CONTACT INFORMATION
- Contact Name
- Contact Phone
- DVR INFORMATION
- DVR Make & Model
- Length of Time Recorded
- Camera Not Operable ○
- Exterior Cameras ○
- Calculator | DVR List | Profile

*FIG. 6C*

- Cancel  DVR Details  Done
- Camera Not Operable ○
- Exterior Cameras ○
- Interior Cameras ○
- NOTES
- Clear Notes
- Calculator | DVR List | Profile

FIG. 7A

●●●●○ Verizon 📶  9:28 AM  🔋

Cancel    DVR Details    Done

LOCATION INFORMATION

Corner Deli 22-18, Mott Avenue, Queens

Queens

| NY | 11691 |

(718) 555-5555

CONTACT INFORMATION

Test case

[Calculator]   DVR List   Profile

FIG. 7B

●●●●○ Verizon 📶  9:27 AM  🔋

Cancel    DVR Details    Done

CONTACT INFORMATION

Test case (718) 555-4444

DVR INFORMATION

Samsung 2300

30 Days

Camera Not Operable  ○

[Calculator]   DVR List   Profile

FIG. 7C

●●●●○ Verizon 📶  9:27 AM  🔋

76 → Cancel    DVR Details    Done  ← 74

Camera Not Operable  ○

Exterior Camera  ▶

Interior Cameras  ▶

NOTES

This is a test to see the notes.

Clear Notes

[Calculator]   DVR List   Profile

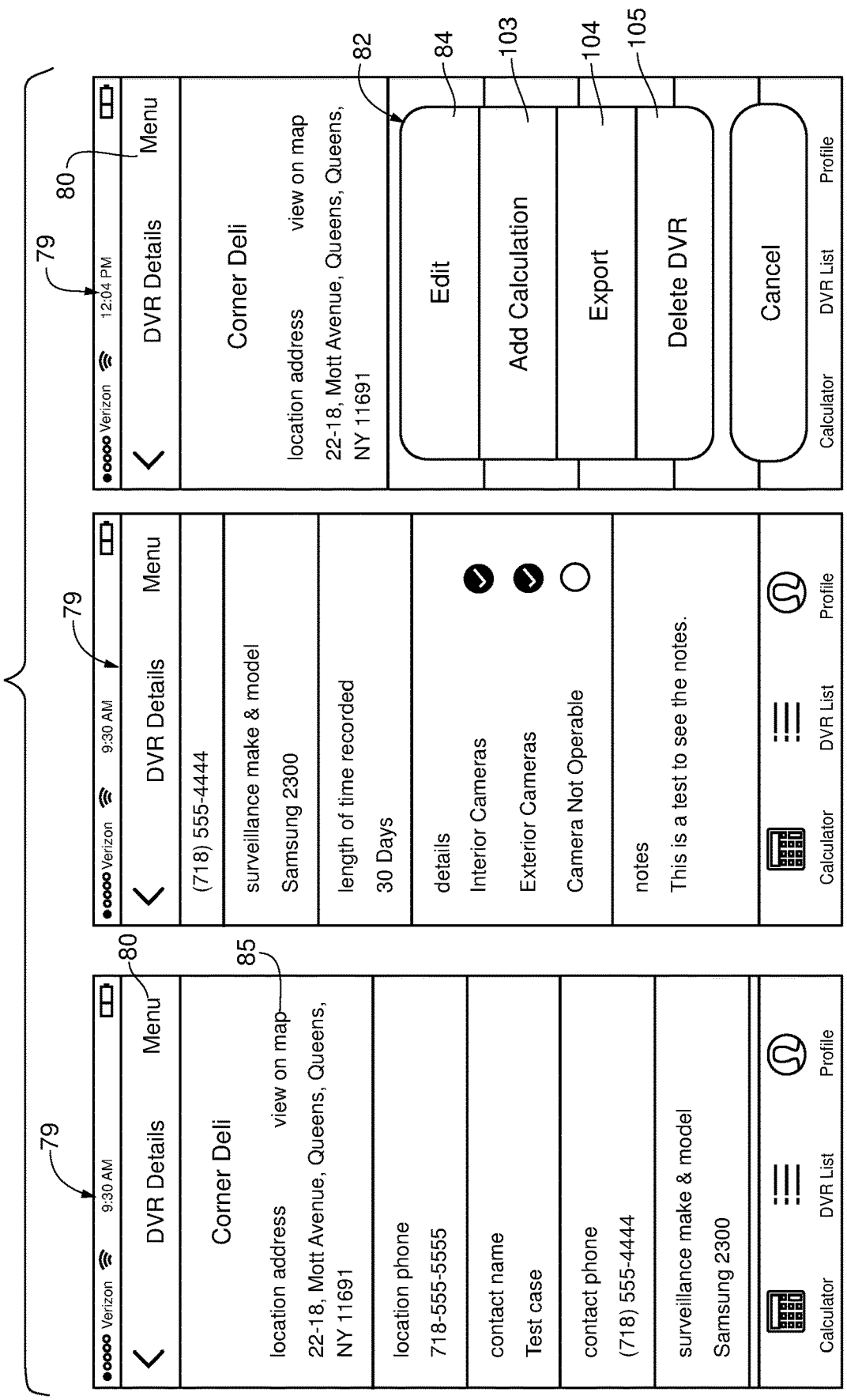

FIG. 16

| LOCATION NAME | ADDRESS, CITY, STATE, ZIP | CONTACT NAME | CONTACT PHONE | NOT OPERABLE | EXTERIOR CAMERAS | INTERIOR CAMERAS | NOTES | CURRENT DATE AND TIME VIEWING DVR | DVR DATE AND TIME | INCIDENT DATE AND TIME | DIFFERENCE DAYS | DIFFERENCE HOURS | GO TO DATE | GO TO TIME | MAKE AND MODEL | LENGTH TIME RECORDED |
|---|---|---|---|---|---|---|---|---|---|---|---|---|---|---|---|---|
| Corner Deli | 22-18, Mott Avenue, Queens, Queens, NY, 11691 | Test case | (718) 555-4444 | NO | YES | YES | This is a test to see the notes. | 2016-04-06 08:34:00 | 2016-04-05 07:23:00 | 2016-04-01 06:45:00 | 01 | -01:11:00 | 03/31/2016 | 05:34:00 PM | Samsung 2300 | 30 Days |
| Centre Street | 80 Centre Street, Lower Manhattan, Manhattan, New York, NY 10013 | Test case | (718) 555-4444 | NO | YES | YES | This is a test to see the notes. | 2016-04-05 19:23:00 | 2016-04-05 17:42:00 | 2016-04-01 06:45:00 | 00 | -01:41:00 | 04/01/2016 | 05:04:00 PM | Samsung 23888 | 30 Days |
| Test Center Building | Test Center Building Domingo Santiago, Brgy. 580, Sampaloc Manila, NCR 121111 | Test case | (718) 555-4444 | NO | YES | YES | This is a test to see the notes. | 2016-04-05 19:23:00 | 2016-04-05 17:42:00 | 2016-04-01 06:45:00 | N/A | N/A | N/A | N/A | N/A | N/A |
| Shore Parkway | Shore Parkway, Canatsie Brooklyn, NY, 11236 | Test case | (718) 555-4444 | NO | NO | NO | This is a test to see the notes. | 2016-04-05 19:23:00 | 2016-04-05 21:12:00 | 2016-04-01 06:45:00 | 0 | 01:49:00 | 04/01/2016 | 08:34:00 AM | Dell | 10 Days |

FIG. 17

| Users | DVR List | | | | Export | Search |
|---|---|---|---|---|---|---|
| Name | Occupation | Agency | Location | Email | Phone | |
| anjali N | dev | agency | hyd,telangana | anjalin@gmail.com | 8529637412 | Upload / Delete |
| anjali r | occupation | agency | hyd,telagana | anjalir@gmail.com | N/A | Upload / Delete |
| anusha N | N/A | N/A | N/A | mail2anushan@gmail.com | N/A | Upload / Delete |
| Anusha N | developer | agency | warangle,telangana | mailanushan@gmail.com | N/A | Upload / Delete |

| Name | Location | Date | User | |
|---|---|---|---|---|
| N/A | Inorbit Mall Road,HITEC City, Hyderabad, Telangana, Hyderabad 500081 | 04/05/2016 | ravi qa | Delete |
| N/A | Inorbit Mall Road,HITEC City, Hyderabad, Telangana, Hyderabad 500081 | 04/05/2016 | ravi qa | Delete |
| oocation | karnareddy, rizamabad, Telangana, nizamabad 503111 | 04/05/2016 | ravi qa | Delete |
| N/A | Inorbit Mall Road,HITEC City, Hyderabad, Telangana, Hyderabad 500081 | 04/05/2016 | Rani k | Delete |
| N/A | madhapur, hyderabad, Telangana, hyderabad 500081 | 04/05/2016 | Anusha N | Delete |
| N/A | madhapur, hyderabad, Telangana, hyderabad 500081 | | | |
| Corner Deli | 22 - 18,Mott Avenue, Queens, Queens, NY, Queens 11691 | 04/05/2016 | Rich zacarese | Delete |

Users — DVR List — 130
Export — 132
Search — 134

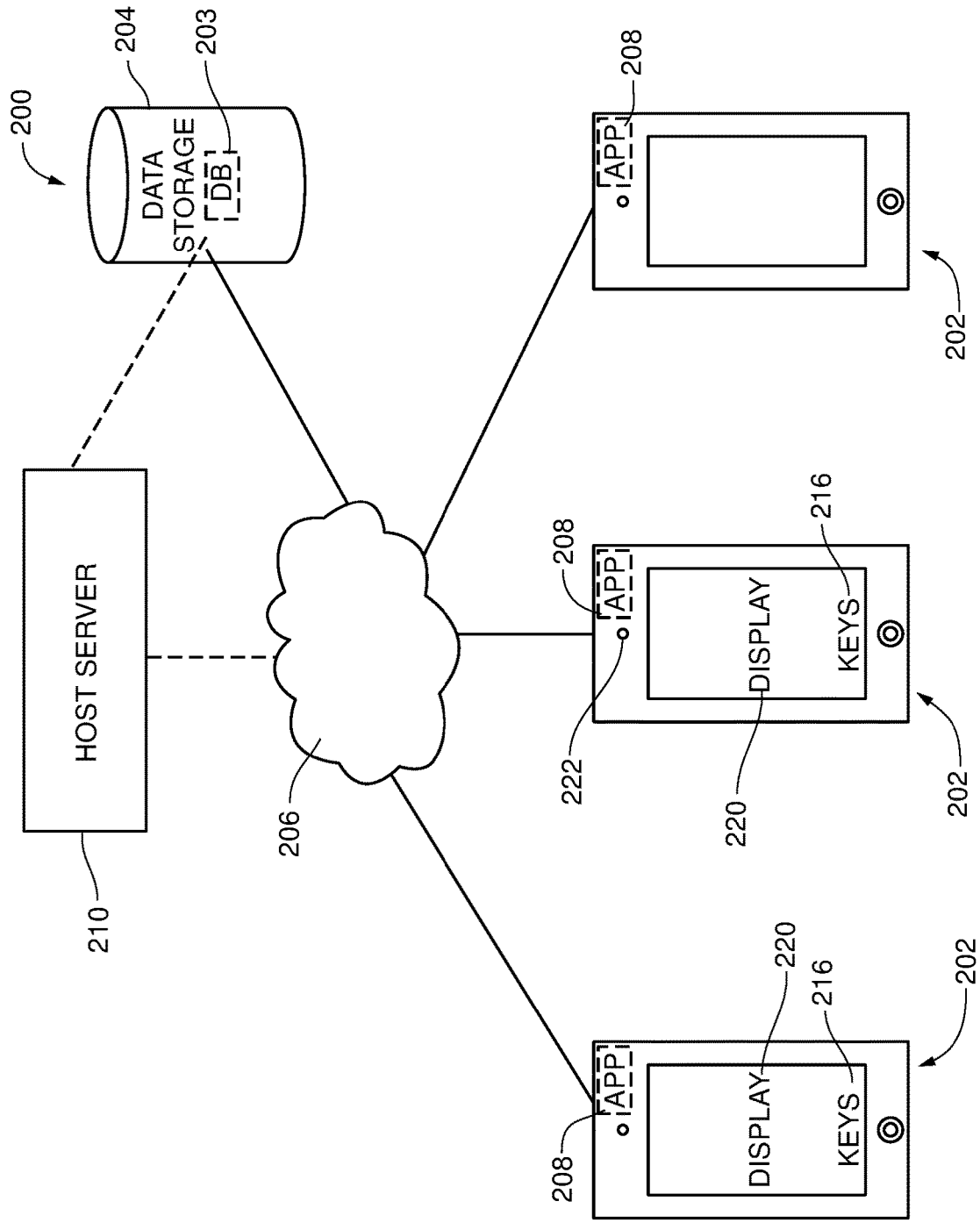

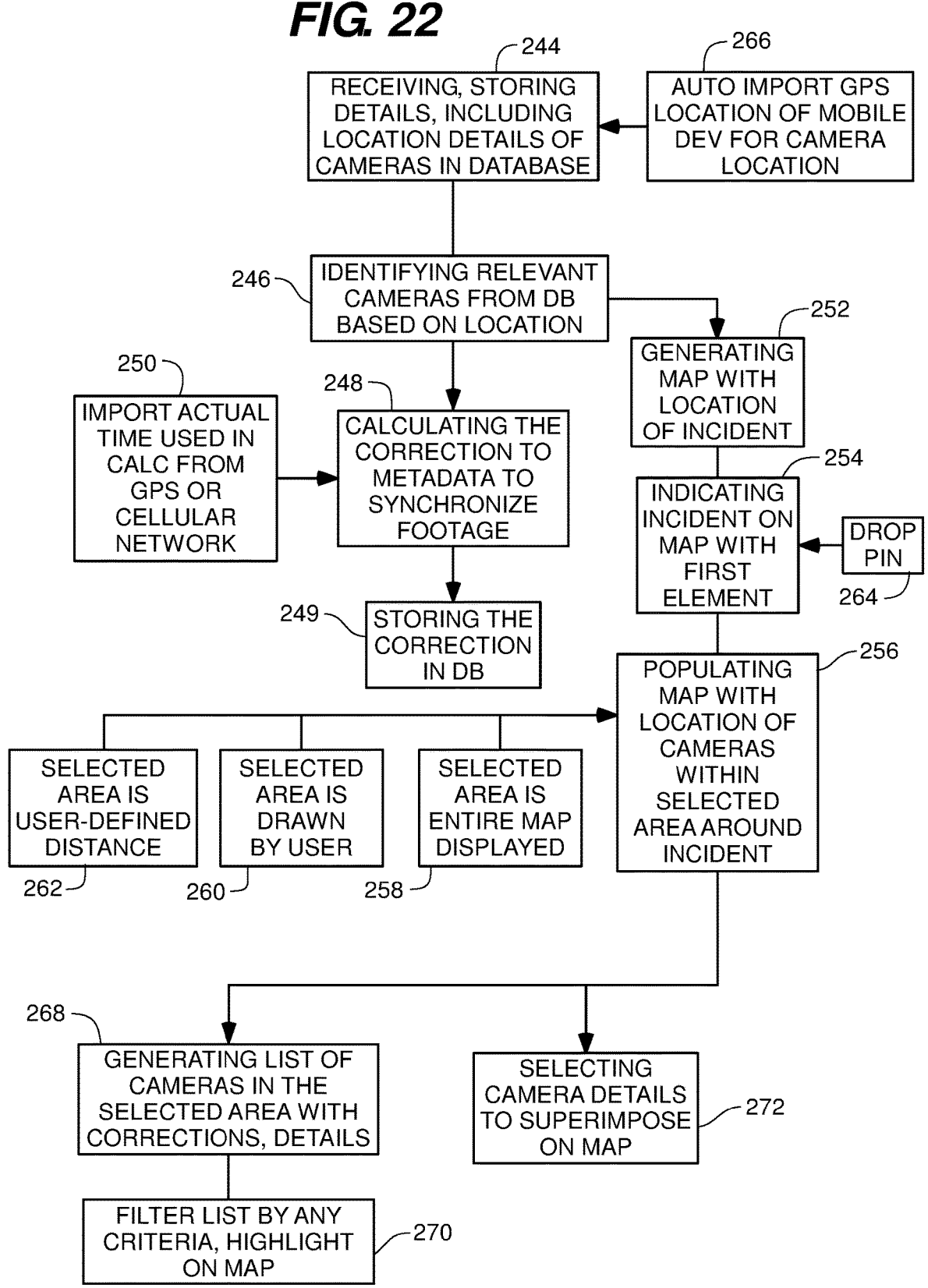

SYSTEM AND METHOD FOR SYNCHRONIZING CAMERA FOOTAGE FROM A PLURALITY OF CAMERAS IN CANVASSING A SCENE

CROSS-REFERENCE TO RELATED APPLICATIONS

This application is a continuation of, and claims the benefit of priority to, co-pending U.S. Ser. No. 15/493,425, filed Apr. 21, 2017, entitled SYSTEM AND METHOD FOR SYNCHRONIZING CAMERA FOOTAGE FROM A PLURALITY OF CAMERAS IN CANVASSING A SCENE, which claims the benefit of and priority to U.S. Provisional Application Ser. No. 62/325,731, filed Apr. 21, 2016, entitled "Camera Canvass Tracker," the entirety of each of which is hereby incorporated herein by reference thereto.

FIELD OF THE DISCLOSURE

The present disclosure relates generally to investigations, such as law enforcement investigations, using cameras to help canvass a scene and, in particular, to a method and system for synchronizing camera footage from a plurality of cameras in canvassing a scene.

BACKGROUND

As the use of surveillance cameras by law enforcement agencies has continued to grow in the fight against crime and terrorism, several problems have been recognized by those tasked to gather video data. Among these problems are inaccuracies in the metadata, particularly, the time of day, and/or the calendar day, that is recorded with the camera surveillance video.

Such errors can easily occur in cameras that still rely on manually set dates and times, and which may have been inaccurately entered. Moreover, even cameras which were initialized manually with accurate calendar day and time entries, or even those which were initialized automatically by synchronizing with satellite data may have failed to properly reset after a power outage or may be "off" due to errors that may occur due to daylight savings time cycles. As a result, such metadata may not accurately represent the date and time when the surveillance footage of a crime scene, for example, was actually recorded.

For example, an investigator wishes to view surveillance video on a camera that could have captured an event of interest. Upon inspecting the camera of interest, the investigator finds that, although the current date and time is actually 3:09 PM, Mar. 11, 2016, the video the camera is currently recording is time-stamped as 10:17 PM, Mar. 9, 2016. The time on the camera is off by one day, plus 16 hours and 52 minutes. The investigator would need to correct for this error to correctly locate the recorded footage on the camera corresponding to the actual time the event occurred. If, for example, an incident occurred on Mar. 3, 2016 at 12:11 PM, the investigator would need to turn this camera to Mar. 1, 2016 at 7:19 PM to view the incident (if captured) on this camera.

Such calculations involving date and time, however, are difficult and time consuming, lend themselves to human error. In particular, they are performed over and over again for the same camera on each occasion the camera is examined by an investigator, and on multiple cameras during an investigation, that need to be cued to the same actual date and time. This is extremely time-consuming, subject to human error, and can lead to questions about the veracity of the video evidence acquired. There is a particular need, therefore, for investigators to quickly locate and obtain footage from any camera that may have captured relevant information, which can then be accurately and quickly synchronized to a time coinciding with an incident under investigation. In addition, because the camera footage and related information may become evidence at trial, it is also essential to document and track the acquisition and analysis of the camera footage, including documenting the basis and accuracy of the calculations to reliably authenticate the actual time that the camera footage corresponds to.

There is a need, therefore, for an incident time calculator to synchronize a camera's date and time metadata with actual, correct data to quickly locate video footage of interest, and to do so for a plurality of cameras that may capture relevant footage of a crime scene, for example.

SUMMARY

The present disclosure is directed to a method and system for synchronizing a camera's date and time metadata with actual, correct data to quickly locate video footage of interest on the camera. The present disclosure is also directed to a method for quickly locating a plurality of cameras that may have viewed activity relevant to an incident under investigation and synchronizing video camera recordings from the plurality of cameras.

The present disclosure is also directed to a method for synchronizing camera footage from a plurality of cameras, which includes identifying, by a processing device, from a database of cameras, a plurality of cameras associated with an incident, based at least on a location of each of the plurality of cameras, and associating each of the plurality of cameras with a correction to at least one of a date and a time in metadata associated with footage recorded by the corresponding camera to facilitate synchronization of the footage recorded by each of the plurality of cameras to an actual date and time, and storing the correction to the metadata for each of the plurality of cameras in the database. The method further includes applying, by the processing device, the correction stored in the database associated with each of the plurality of cameras to determine at least one of an adjusted date and an adjusted time in the metadata for each camera that corresponds to footage recorded at a particular date and time related to the incident. The method further includes synchronizing the footage of each of the plurality of cameras to the particular date and time, including cueing the footage of each of the plurality of cameras to the particular date and time based on the at least one of the adjusted date and the adjusted time determined from the correction to the metadata stored in the database for each of the plurality of cameras.

In aspects, the correction to the metadata stored in the database can be applied simultaneously for each of the plurality of cameras.

In additional aspects, a new particular date and time may be entered via a user device operatively connected to the processing device and the correction saved in the database simultaneously applied to determine at least one of a new adjusted date and a new adjusted time for one of the plurality of cameras.

In one aspect, the method further includes generating, by the processing device, a list of the plurality of cameras identified from the identifying step, and exporting, by the processing device, the list to a file and/or an email account associated with a user ID. The list preferably includes the location, the correction, and the at least one of the adjusted date and the adjusted time in the metadata associated with each of the plurality of cameras.

The method may further include associating, by the processing device, the list with at least one of a case number, a user ID, and a group associated with the user ID.

In another aspect, the method further includes receiving and storing, by a processing device, details of cameras in a database. The cameras stored in the database include the plurality of cameras that are identified based on their location. The plurality of cameras are identified from location details based on their location relative to an incident location at which the incident occurred. The details stored in the database for each camera include location details, including a geographical location associated with each camera in the database.

The details received and stored for one camera in the database include the actual date and time and at least one of an observed date and an observed time in the metadata coinciding with the actual date and time, wherein the at least one of the observed date and the observed time are received via user input to a user device operatively connected to the database.

In various aspects, the details of each of the cameras in the database further include at least one of a camera operable indicator, contact information, a make and model of the corresponding camera, a date the corresponding camera was entered into the database, and a date the corresponding camera was last synchronized.

In aspects, the method further includes calculating, for the one camera in the database, the correction to the metadata to synchronize the footage based on the at least one of the observed date and the observed time recorded by the one camera coinciding with the actual date and time that the metadata (date and time) are recorded. The method further includes associating the one camera in the database of cameras with the corresponding correction and storing the corresponding correction in the database.

In additional aspects, the actual date and time for the one camera may be automatically imported via the user device from one of a cellular network and a GPS date/time stamp coinciding with the observed date and the observed time in the metadata.

In additional aspects, the camera data may be received and stored in the database via integrated mapping functions. In one aspect, the method may further include generating a map of an area that includes the incident location, and displaying it on a user device operatively connected to the database. The method also includes indicating the incident location on the map with a first graphical element; and populating the map with a plurality of second graphical elements indicating the geographical location of each camera from the database within a selected area around the first graphical element. Each camera located within the selected area corresponds to one of the plurality of cameras that is identified as potentially relevant, based on its location.

In aspects, the method further includes generating a list of the plurality of cameras using the plurality of second graphical elements within the selected area. The list includes at least the location, the correction, and the at least one of the adjusted date and the adjusted time in the metadata associated with each of the plurality of cameras.

In various aspects, the selected area may include the entire area of the map displayed on the user device; or a bounded region graphically defined by user input via the user device; or a bounded region defined by a user-defined distance from the incident location. All of these options may be available to a user via a user device from which the methods are executed, based on the user's selection of the various options.

The user, in aspects, may also fix the incident location on the map by dragging and dropping the first graphical element onto the map at the incident location.

In further aspects, the method may include selecting, via user input, one or more details associated with each of the plurality of cameras, and superimposing on the map the one or more details for at least one of the plurality of cameras.

The list may be filtered according to any of the details of the cameras stored in the database, and the filtered list may be graphically highlighted on the map.

The present disclosure is further directed to a method that includes calculating a difference between a camera's metadata, particularly, the time and date embedded with the video footage, and the actual, correct time and date. The method further includes applying the calculated difference to a date and time of an event of interest, to determine the embedded time and date of the video footage corresponding thereto, to assist a user in locating and viewing the corresponding video footage.

In aspects, the method may also include storing information associated with the camera in a database, including the location of the camera, the calculated difference, and a date on which the calculated difference was determined. A listing of the locations of the cameras for which details are entered are viewable by the user. A list and location, also viewable on a map, of cameras within a certain radius of an event can be quickly accessed.

The present disclosure is also directed to a method for synchronizing camera footage from a plurality of cameras, the method including identifying, by a processing device, a plurality of cameras within a predetermined distance of an incident, wherein the incident occurs at a predicted, or known, date and time. The step of identifying includes automatically identifying, by the processing device, the plurality of cameras based on a location of the incident and on details of locations of the plurality of cameras. The details of the plurality of cameras are preferably stored in, and accessed from, a database that preferably includes details for cameras from a large geographical area, i.e., including cameras not relevant to the incident or near the location of the incident being investigated. The method further includes calculating, by the processing device, for each of the plurality of cameras, a difference between an actual date and time, which may be based on data manually entered by a user or on an automatically generated timestamp, and a recorded date and time, e.g., in metadata, associated with the corresponding camera. For each of the plurality of cameras, the difference is applied, by the processing device, to the predicted date and time to generate a new recorded date and time associated with the corresponding camera for locating and viewing footage, recorded by the corresponding camera, at the predicted date and time relevant to the incident. A list of the plurality of cameras is exported by the processing device. The list includes the location of each corresponding camera, and the new recorded date and time associated therewith, for locating and viewing footage relevant to the incident.

The present disclosure is also directed to a method for synchronizing camera footage from a plurality of cameras, which includes providing a database associated with a plurality of cameras, and which is accessible via a user device, wherein the database includes a correction associated with each of the plurality of cameras to at least one of a date and a time in metadata associated with footage recorded by the corresponding camera, to facilitate synchronization of the footage recorded by each of the plurality of cameras to an actual date and time. The method also includes applying, by a processing device, the correction stored in the database associated with at least one camera of the plurality of cameras to determine at least one of an adjusted date and an adjusted time in the metadata for the at least one of the plurality of cameras corresponding to footage recorded at a particular date and time; and synchronizing, by the processing device, the footage of the at least one of the plurality of cameras to the particular date and time, based on the at least one of the adjusted date and the adjusted time determined from the correction to the metadata stored in the database for the at least one of the plurality of cameras.

In aspects, the method includes cueing the footage of the at least one of the plurality of cameras to the particular date and time.

In additional aspects, the method may further include receiving, by the processing device, for the at least one camera, the actual date and time, and the date and the time in the metadata associated with the footage recorded by the at least one camera at the actual date and time; determining, via the processing device, the correction associated with the at least one camera; and storing and associating, via the processing device, the correction associated with the at least one camera.

In aspects, the method may further include displaying on a screen operatively connected to the processing device, the at least one of the adjusted date and the adjusted time in the metadata for synchronizing the footage of the camera to the particular date and time.

In some aspects, the method further includes storing and associating, by the processing device, details associated with each of the plurality of cameras, the details including location details including a geographical location associated with each camera in the database.

The method may further include identifying, by the processing device, the at least one camera for applying the correction, based on a proximity of the geographical location associated therewith to a particular location.

In additional aspects, the method may further include adding, via the processing device, one camera to the database, and storing and associating, via the processing device, details associated therewith, wherein the details stored and associated for the one camera include the actual date and time and at least one of an observed date and an observed time in the metadata coinciding with the actual date and time, wherein the at least one of the observed date and the observed time are received via user input to a user device operatively connected to the database.

The method may further include calculating, for the one camera, the correction to the metadata to synchronize the footage for the one camera based on the at least one of the observed date and the observed time recorded by the one camera coinciding with the actual date and time; and associating the one camera with the corresponding correction and storing the corresponding correction in the database.

In aspects, the actual date and time for the one camera is automatically imported via the user device from one of a cellular network and a GPS date/time stamp coinciding with the observed date and the observed time in the metadata.

In additional aspects, the storing and associating further includes automatically importing the geographical location for the one camera co-located with a user device based on GPS location data for the user device.

The details of each of the plurality of cameras in the database, in aspects, may further include at least one of a camera operable indicator, the flag indicating one of operable and not operable status, contact information, a make and model of the corresponding camera, a date the corresponding camera was entered into the database, and a date the corresponding camera was last synchronized.

In aspects, the at least one camera is a list of cameras, the method further including identifying, by the processing device, the list of cameras from the plurality of cameras based on the proximity of the geographical location of each camera to the particular location, wherein the details of each camera in the list of cameras includes the location, the correction, and the at least one of the adjusted date and the adjusted time in the metadata associated with each corresponding camera in the list of cameras.

The method may further include exporting, by the processing device, the list of cameras and the details associated therewith to at least one of a file and an email account associated with a user ID.

In still additional aspects, the method may include generating a map of an area that includes the particular location, and displaying it on a user device operatively connected to the database; and indicating the particular location on the map with a first graphical element. Identifying the list of cameras may further include populating the map with a plurality of second graphical elements indicating the geographical location of each of the plurality of cameras within a selected area around the first graphical element, each camera located within the selected area corresponding to one camera on the list of cameras.

In aspects, the selected area is the area of the map displayed on the user device, or in other aspects, is a bounded region graphically defined by user input via the user device.

The bounded region may be defined by a user-defined distance from the particular location.

The present disclosure is also directed to a system for synchronizing camera footage from a plurality of cameras, the system including: a processing device and a database operably connected to the processing device; and a storage device for storing instructions. The database includes a correction associated with each of a plurality of cameras to at least one of a date and a time in metadata associated with footage recorded by the corresponding camera, to facilitate synchronization of the footage recorded by each of the plurality of cameras to an actual date and time. The system also includes a storage device for storing instructions that, when executed by the processing device, perform operations including: applying the correction stored in the database associated with at least one camera of the plurality of cameras to determine at least one of an adjusted date and an adjusted time in the metadata for the at least one of the plurality of cameras corresponding to footage recorded at a particular date and time; and synchronizing the footage of the at least one of the plurality of cameras to the particular date and time, based on the at least one of the adjusted date and the adjusted time determined from the correction to the metadata stored in the database for the at least one of the plurality of cameras.

In aspects, the storage device includes further instructions that, when executed by the processing device, perform further operations including receiving, for the at least one camera, the actual date and time, and the date and the time in the metadata associated with the footage recorded by the at least one camera at the actual date and time, determining the correction associated with the at least one camera, and storing and associating the correction with the at least one camera in the database.

In aspects, the system further includes a screen operatively connected to the processing device, wherein the storage device includes further instructions that, when executed by the processing device, perform further operations including displaying on the screen the at least one of the adjusted date and the adjusted time in the metadata for synchronizing the footage of the camera to the particular date and time.

In additional aspects, the database further includes details associated with each of the plurality of cameras. The details may include location details, including a geographical location, associated with each camera in the database.

In further aspects, the at least one camera is a list of cameras, and the storage device includes further instructions that, when executed by the processing device, perform further operations including: generating a map of an area that includes an incident location, displaying it on the screen operatively connected to the processing device, indicating the incident location on the map with a first graphical element, and identifying the list of cameras from the plurality of cameras for applying the corresponding correction based on the location of each of the plurality of cameras relative to the incident location.

In aspects, identifying further includes populating the map with a plurality of second graphical elements indicating the geographical location of each camera from the database within a selected area around the first graphical element, each camera located within the selected area corresponding to one of the plurality of cameras.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the accompanying drawings, which form a part of this disclosure.

FIGS. 1-3 represent three consecutive screen shots (viewed by scrolling) of a so-called calculator screen viewed from a mobile device, such as a mobile phone or tablet, executing a computer programming application ("app") that implements embodiments of a method of the present disclosure.

FIGS. 4A-4C represent completed calculator screens FIGS. 1-3, respectively, after data is entered and the calculator is executed via the app, the executed calculations shown in FIG. 4C.

FIG. 5 represents a fourth consecutive screen shot of the embodiment of the calculator screen.

FIGS. 6A-6C represent three consecutive screen shots (viewed by scrolling) of an embodiment of a DVR Details screen accessible via the calculator screen of FIG. 5, for example.

FIGS. 7A-7C represent an example of completed DVR Details screen FIGS. 6A-6C, respectively, after data is entered via the app.

FIG. 8 represents a screen shot of the saved DVR Details screen after a user selects the "Done" button, and a Menu screen selected from the saved Details screen with additional options.

FIG. 16 is an example of a report of a DVR List generated in accordance with an embodiment of the present disclosure.

FIGS. 17-18 are representative user and DVR list screens, respectively, for use by an administrator of at least one group of users in accordance with the embodiments.

FIG. 19 is a schematic diagram of an embodiment of a system of the present disclosure.

FIG. 22 is a block diagram representation of additional embodiments of a method of the present disclosure.

Figure 9:
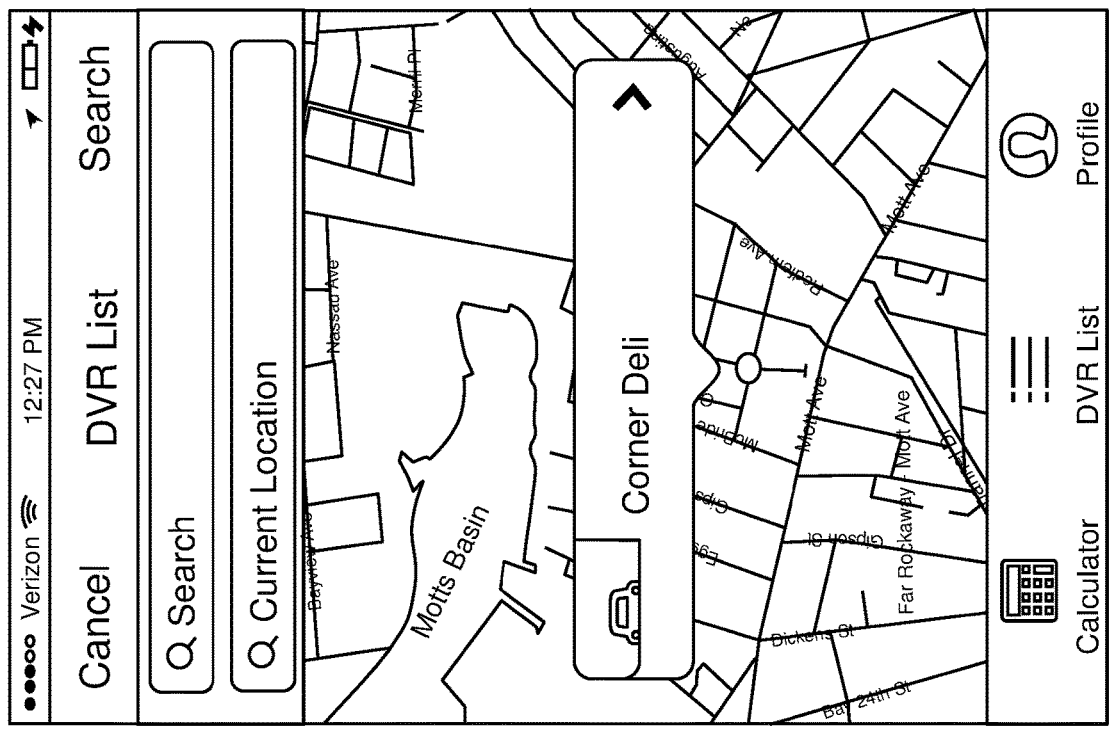
FIG. 9 represents a screen shot of a map view generated by the app.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

It is particularly advantageous to an investigator tasked with canvassing of a crime scene or other incident to implement the functions and methods of the disclosure for synchronizing video camera footage for use on a mobile device. In the embodiments described herein, the methods of the disclosure are implemented at least in part through modules and/or computer programming applications, referred to as "apps," installed and executed on a mobile device. It is understood, however, that the disclosure is not limited thereto.

In particular, as will be appreciated by one of ordinary skill in the art, aspects of the present disclosure may be embodied as a method, a system, and/or a computer program product. Accordingly, aspects of the present disclosure may take the form of an entirely hardware embodiment, an entirely software embodiment, or an embodiment combining aspects of both hardware and software. Furthermore, the present disclosure may take the form of a computer program product on a computer-readable storage medium having computer-readable program code means embodied in the storage medium. Any suitable computer-readable storage medium may be utilized, including volatile and non-volatile, removable and non-removable media implemented in any method or technology for storage of information, such as computer readable instructions, data structures, program modules, or other data, and further including hard disks, CD-ROM, DVD-ROM, optical storage devices, magnetic storage devices, semiconductor memory storage devices (e.g., USB thumb drives, flash memory or other memory technology) and/or the like, including RAM, ROM, and EEPROM, or any other medium which can be used to store information and instructions which can be accessed by an application, module, and so on for execution by a processing device. Any such computer storage media may be part of the device or accessible or connectable thereto.

It should be noted that computer-readable storage medium, which may also be referred to as "non-transitory media," refers to any tangible media, including those listed above, which can be coupled to or may be a component of a computer, having computer-readable program code means embodied therein. The term computer-readable storage medium is not intended to limit the type of physical device and includes types of storage devices that do not necessarily store information permanently, including for example, random access memory (RAM). Program instructions and data stored on a tangible computer-readable storage medium/memory in non-transitory form may further be transmitted by transmission media or signals such as electrical, electromagnetic, or digital signals, which may be conveyed via a communication medium such as a network and/or a wireless link.

Computer program instructions embodying the present disclosure may also be stored in a computer-readable memory that can direct a computer or other suitable programmable device to function in a particular manner, such that the instructions stored in the computer-readable memory produce an article of manufacture, including instruction means, that implement the function specified in the description or flowchart block(s). The computer program instructions embodying the methods of the present disclosure may also be loaded onto a computer or other programmable device, including a mobile device, to cause a series of operational steps to be performed, e.g., by a processor, on the computer or other programmable device to produce a computer-implemented process such that the instructions that execute on the computer or other programmable device provide steps for implementing the functions specified in the present disclosure.

One skilled in the art will also appreciate that any databases, systems, or components of the present disclosure may consist of any combination of databases or components at a single location or at multiple locations, and which may be accessible remotely via any appropriate connection via any network (cloud, internet, cellular, LAN, WiFi and so on), and wherein each database or system may also include any of various suitable security features, such as firewalls, access codes, encryption, de-encryption, compression, decompression, and/or the like.

The disclosed systems and/or methods may be embodied, at least in part, in application software that may be downloaded, in whole or in part, from either a public or private website or an application store ("app store") to a mobile device. In another embodiment, the disclosed system and method may be included in whole or in part in the mobile device firmware, hardware, and/or software.

In another embodiment, the disclosed systems and/or methods may be embodied, in whole or in part, in application software executing within a webserver to provide a web-based interface to the described functionality.

In yet other embodiments, all or part of the disclosed systems and/or methods may be provided as one or more callable modules, an application programming interface (e.g., an API), a source library, an object library, a plug-in or snap-in, a dynamic link library (e.g., DLL), or any software architecture capable of providing the functionality disclosed herein.

The present disclosure is directed to a method and system for synchronizing a camera's date and time metadata with actual, correct data to quickly locate video footage of interest on the camera. The present disclosure is also directed to a method and system for quickly locating and synchronizing video footage from a plurality of cameras that may have viewed activity relevant to an incident under investigation.

Currently, there is no known method or system for quickly identifying a plurality of cameras that may have viewed activity relevant to an incident under investigation, and quickly, or simultaneously, synchronizing footage from the plurality of cameras, each of which may be independently owned and operated. The system and methods of the present disclosure are particularly useful to investigators when canvassing a crime scene.

The term "synchronize" is used herein according to its conventional meaning, that is, to cause to agree in time of occurrence, or to assign to the same time. For example, synchronizing a camera or video footage refers to determining an actual date and time that corresponds to a recorded date and time in the camera's metadata. By "synchronizing" a camera, the camera footage can be properly and accurately cued, using its recorded metadata, to an actual date and time for viewing footage of interest.

The term "camera" as used herein, unless otherwise indicated, refers to an imaging (camera lens) unit viewing a scene together with a recorder and recording media that records and stores the images, referred to herein as "camera footage" or "video footage." The recorder is operably connected to the imaging unit, and the recorder is usually located within close proximity to the imaging unit.

The term "metadata" is used herein according to its conventional meaning to refer to data that describes and gives information about other data. For example, metadata about recorded video includes a date and time associated with, and is usually recorded with, or stored in a video file associated with, recorded video footage. Metadata, including date and time may be superimposed over and simultaneously viewed along with the footage on a monitor connected to the camera. The date/time recorded in the metadata advances with the temporally advancing video footage.

Accordingly, "recorded" date and time refers to the recorded date and time saved as metadata associated with recorded camera footage.

The phrase "actual" is used according to its normal usage to refer to actual, true, date and time. Preferably, an actual date and time as used herein is obtained from a verifiable and reliable source of date/time data.

Figure 20:
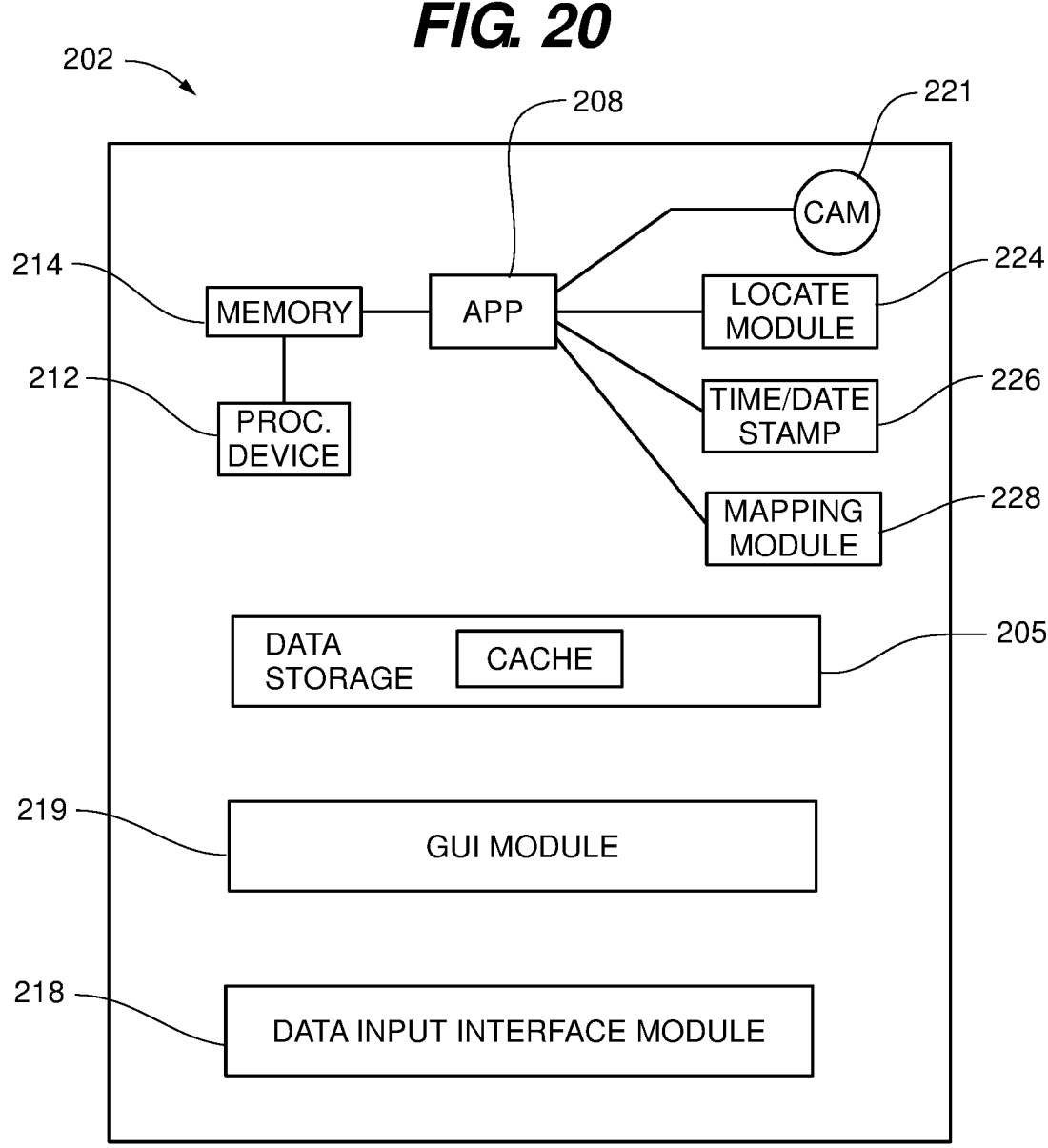
FIG. 20 is a functional block diagram of a user device configured to implement embodiments of methods of the present disclosure.

An embodiment of a system of the disclosure is described in reference to FIGS. 19 and 20. Referring to FIG. 19, in one embodiment, a system 200 of the present disclosure includes a plurality of user devices 202 operatively connected to a database 203. In the embodiments shown, one or more of the user devices 202 are mobile devices. Such mobile devices may be mobile phones, tablets, or other portable programmable devices configured with any suitable networking components for communicating via the network 206 with the database 203.

In other embodiments, one or more of the user devices 202 may be a computer system such as desktop or portable laptop computers having access to and configured to execute a canvassing module 208 and other modules described herein to perform the methods of the present disclosure.

The database 203, which may be stored in remote computer storage media or in so-called cloud storage 204 and accessed via a suitable network 206 connection, is accessible to each one of the user devices 202 via the canvassing module or app 208 associated with each corresponding user device 202. The database 203 is configured to receive and store, and allow access to, details associated with video cameras via the canvassing modules 208. The details stored in the database 203 include at least corrections to each of the camera's date/time metadata needed to synchronize the cameras to an actual, correct date/time, and a location of each of the cameras.

One of skill in the art will appreciate that the user device(s) 202 may also include storage and/or cache 205 for storing, either temporarily, or permanently, data retrieved from the database 203.

The stored details may be accessed and used to identify cameras that may have captured information and recorded footage relevant to an incident or crime under investigation, and to synchronize the footage from the identified video cameras. The footage acquired by the video cameras may also be stored in the database 203 for access by users of the app 208.

Access to the stored details and footage may be controlled by an administrator, who may provide oversight, e.g., set permissions of users on a group basis, wherein each user device 202 is associated with at least one group. The administrator may access the app 208 via an administrator panel screen accessible via the app 208 only to those with administrative privilege, such as those shown in FIGS. 17 and 18, or via a web-based interface on any computer device.

A host server device 210 may be operably connected to, or may be part of the system 200. Preferably, the host server device 210 is operably connected to and able to access the database 203, either remotely, e.g., via the network 206, or through a direct connection, and may also be operably connected via the cloud or network 206 to the plurality of devices 202. In embodiments, the host server 210 is further configured to be in communication with the canvassing modules 208, and to control various aspects of the system 200, in an administrative oversight capacity. For example, the host server device 210 may be accessed by the administrator via a web-based interface to control which user devices 202 can have access to the database 203, and may be configured to further limit each user's permissions and access to particular files, including the stored details associated with the video cameras and footage acquired by the video cameras, stored in the database 203, e.g., on a group basis, wherein each user device 202 is associated with at least one group. The host server device 210 may also provide access to users to download the app 208 and preferably hosts a web-based version of the canvass programming application 208. Users may then access the same functionality of the app 208 via the web-based version from any desktop, laptop computer or cellular device (although some of the features, such as automatic location features, will not be useful to an investigator accessing the web-based version from a desktop or laptop computer that is not located at a scene of a crime or other incident under investigation).

An administrator may also generate a directory associated with a case number for the investigation, which may be located on the storage media 204, and to which particular users, each user being associated with a user identifier ("user ID") and password, associated with an authorized group and/or with the case number can save details of cameras and camera footage either via the app 208 or a web-based interface.

In some embodiments, the host server 210 may be associated with a police department or other investigative authority and may be centrally located for appropriate direct access by an authorized person within the investigative body.

FIG. 20 depicts a functional block diagram of an embodiment of one of the user devices 202. Each device includes at least a processing device 212, and memory or computer-readable storage 214 for storage of instructions, software, or executable code, which when executed by the processing device 212 causes the processing device(s) 212 to perform the methods and/or method steps of the present disclosure. The instructions may be implemented in programming steps of software or instructions via the canvassing app 208, which is installed on the mobile device 202. Such steps may be executed in cooperation with additional modules and components.

For example, the mobile device 202 also preferably includes a data input interface module 218 to facilitate user input, which may include keys or virtual keys 216, and/or a microphone, a graphical user interface module 219 for communicating images to a display screen 220 and a camera module 221 for communicating with camera 222. The mobile device 202 may also include additional apps and/or programming modules that may communicate information and data to the canvassing module 208, such as a location module 224 providing automatic location data and functions, a date/time stamp module 226 providing automatic actual time data and functions, and a mapping module 228 integrating camera details over a map for access and viewing functions inter alia.

While certain functions and methods may be described herein as being implemented by these various separate modules, it is understood that the modules represent functionality that may be combined or implemented in any number of ways, e.g., integrated into a single app or otherwise distributed among various apps, or modules, as well as software modules, and hardware components associated with the mobile device 202 and/or another device, such as the host server 210.

Figure 21:
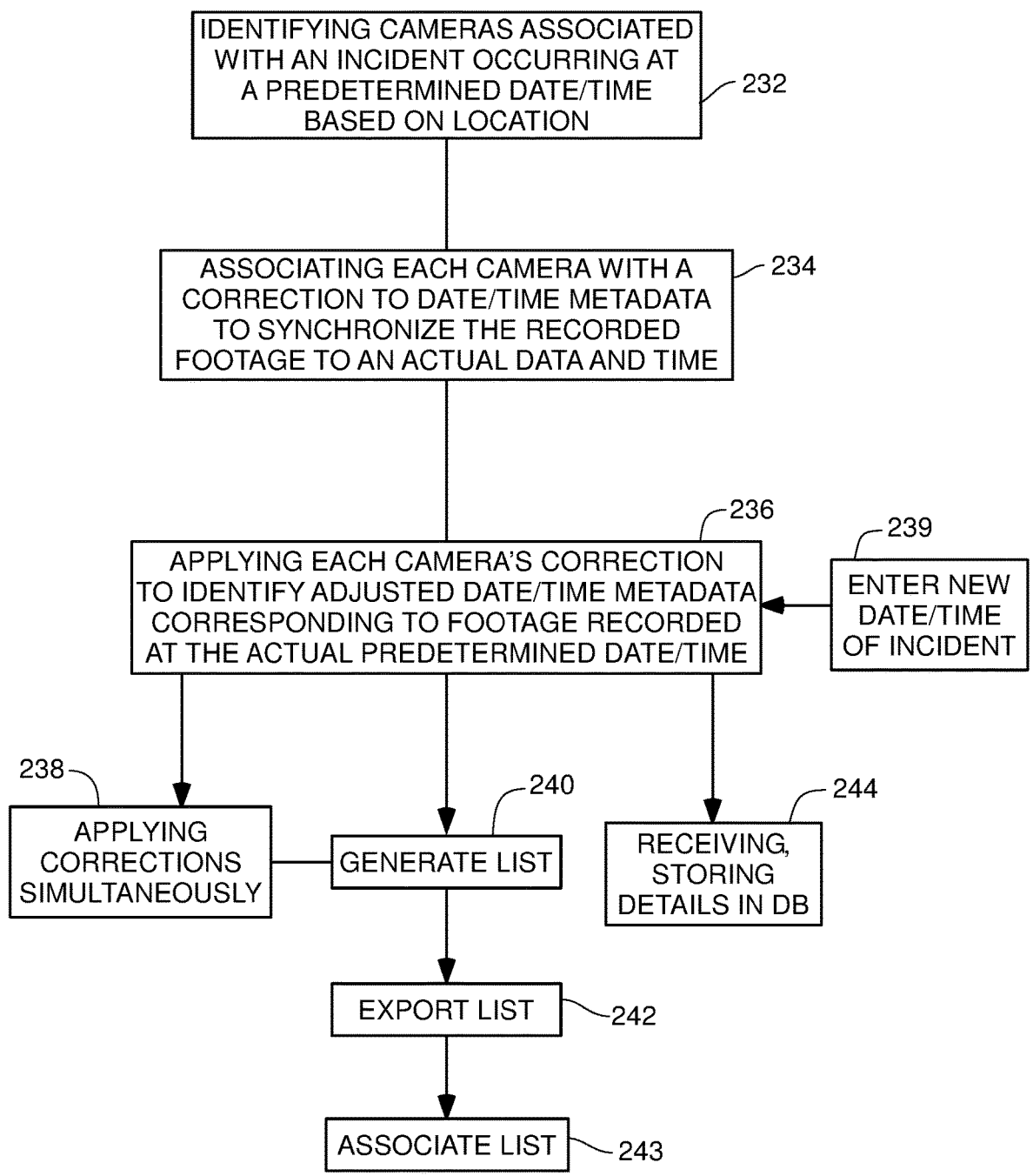
FIG. 21 is a block diagram representation of embodiments of a method of the present disclosure.

Embodiments of the methods described herein are implemented via the app 208 and system shown in FIGS. 19 and 20. FIGS. 21 and 22 describe embodiments of methods of the present disclosure. It is noted that FIGS. 21 and 22 are non-limiting examples, and various methods within the scope of the disclosure may include various combinations of various functional blocks, or method steps, represented in these figures, and that the various method steps do not necessarily have to be performed in the order indicated in the figures, but may be performed in any suitable order, and/or simultaneously.

In reference to FIG. 21, embodiments of a method 230 for synchronizing camera footage from a plurality of cameras includes identifying, at 232, a plurality of cameras that may be relevant to an investigation of an incident that occurred at a predetermined date and time based on location data. The method also includes associating a correction, at 234, to each of the camera's date and time metadata to synchronize recorded camera footage to an actual date and time, and then applying, at 236, the correction corresponding to each camera to determine an adjusted date and time in the metadata of the corresponding camera that corresponds to footage recorded at the actual, predetermined date and time of the incident.

Once the user identifies relevant cameras via the app 208, and in embodiments, generates a list, at 240 of, the relevant cameras based on location, each correction can be applied across all identified cameras, at 238, to each camera simultaneously to synchronize the plurality of cameras to an actual predetermined date/time of an incident of interest. In embodiments, once the list of relevant cameras are identified, a new predetermined time of incident may be entered, if desired, and applied, at 239, to simultaneously determine a new adjusted date and time for each of the plurality of cameras based on the correction that corresponds to each camera. The list, which can also contain any number of additional details about each camera, as well as investigator's notes and so on, can then be exported, at 242, to any suitable file format, for generating a report, for example, or to an email account, and which may be saved by the user, e.g., in a user's directory (a directory to which the user is granted access, e.g., by case number), in any suitable storage media. The list may also be associated, at 243, with a case number, and/or group associated with the user operating a particular user device.

In embodiments, the list can be exported to a table listing the plurality of cameras along with their associated details, and saved in any suitable file format. The list/table can be further be associated with a case number, and saved in file format to a directory, for example, associated with the case number. The associated recorded footage from the cameras in the list may also be stored in the directory, to which access may be limited to only those users associated with the particular investigation and case number.

While the database 203 may be accessed by users via the canvassing app 208 to retrieve camera details, and to calculate the adjusted date/time in metadata to synchronize camera footage, users preferably also add new cameras to continue to build the database 204 via the app 208. Even if a user wishes to access the app 208 for a quick calculation of a correction to a camera of interest, the user is prompted to at least add the location of the camera. The user input including the location and the details required to calculate the correction are automatically added to the database. The correction is also automatically calculated and stored with the camera details, so that cameras of interest to future investigations can be both quickly identified and synchronized.

Accordingly, referring also to FIG. 22, embodiments of the method may also include implementing the app 208 for receiving and storing, at 244, in the database 203, details of cameras including location data, which can then be used to quickly identify, at 246, any number of cameras that are relevant to an investigation based on the location details of all cameras stored in the database 203. The corrections associated with each of the cameras are calculated, at 248, and each correction, and preferably the actual date/time and observed date/time relied on for calculating each of the corrections are also preferably stored, at 249, in the database. This information is valuable for verifying the accuracy of the calculations and for supporting the relevance and veracity of the footage if needed at trial.

When a user enters location data for a new camera via a mobile device 202, presumably the mobile device is, at the time the camera's location is entered by the user, co-located with the camera. Accordingly, in embodiments, the user may choose an option via the app to automatically import, at 266, the current GPS location for the mobile device to the app for receiving and storing the camera location in the database 203.

The user may manually add both the observed day and time metadata and the concurrent actual day and time of the observation. In some embodiments, the app 208 automatically imports, at 250, and saves the actual date and time when the observed metadata is entered. The actual date/time may be imported from a date/time stamp acquired from the cellular network connected to the mobile device 202, from GPS, or other suitable sources, and may be processed via the date/time stamp module 226. As the details for each of the new cameras are entered via the app 208, the correction is automatically calculated, at 248, and preferably stored, at 249, in the database 203 for each camera.

In some embodiments, a user may also take a photo of the observed date and time displayed on a DVR, e.g., and save it to the user device as well as to the database 203. The photo acquired by the mobile device 202 will also have an automatically-generated time stamp, so that the photo of the DVR metadata together with the actual date and time from the mobile device metadata (the automatically-generated time stamp) provide additional data to verify the accuracy of the corrections calculated for each camera.

As described further in regard to an example of various screens (FIGS. 1-15) and functions of an app formed in accordance with the disclosure, embodiments also include mapping features for, inter alia, quickly and visually identifying relevant cameras and details. For example, referring still to FIG. 22, embodiments may include generating a map of an area that includes the incident location, at 252, and displaying it on the user's mobile device 202. The method further includes indicating the incident location on the map with a first graphical element, at 254, and populating the map, at 256, with a plurality of second graphical elements indicating the geographical location of each camera from the database within a selected area around the first graphical element. Accordingly, relevant cameras are easily identified, at 246, as those located within the selected area shown on the map.

In embodiments, a pin may be dragged and dropped, at 264, onto the map to indicate a location of interest, e.g., the location of the incident under investigation.

In additional embodiments, the app 208 preferably allows the user various options for selecting the area around the incident for identifying cameras thought to be relevant. For example, the area may be selected, at 258, as the entire map displayed on the map screen of the user device 202. In this case, the geographical area used to identify/view locations of relevant cameras is controlled by the area displayed on the map, as selected by the user via a user-adjustable zooming feature toggled to the display, for example. The user may also select the area to be any bounded region graphically defined by user input via the mobile device, at 260, e.g., by drawing any region of interest around the incident location. The user may also select, at 262, an option for selecting a radial distance around the incident location to locate relevant cameras, and may enter any user-defined distance to use for plotting cameras on the map that fall within that distance from the incident.

The list of cameras that are identified as potentially relevant to the investigation of the incident may then be generated, at 268, from those cameras displayed in the selected area of the map. The list of cameras may be further filtered, at 270, in accordance with any of the fields of details recorded in the database 203.

In further embodiments, the user may also select one or more details associated with the cameras, and superimpose, at 272, the selected details on the map one of the cameras, e.g., by hovering a pointer over the camera, or simultaneously for all of the cameras, e.g., using a toggle selected via the app 208.

Further embodiments of the methods of the present disclosure implemented via the canvassing app 208, as accessed and utilized by a user from a mobile device 202, will be apparent in further reference to user-viewable screens shown in FIGS. 1-15. It is understood that the particular design elements used in this example, including displays, screens, and means of moving from one screen to another, or of other functions, by virtual buttons, virtual keyboard strokes and so on can be implemented in numerous ways and the methods of the disclosure are not limited thereto.

It is noted that FIGS. 1-15 also refer to a "DVR," a digital video recorder, however, it is understood that the scope of the disclosure is not limited thereto. The methods and systems described herein and in the figures apply to any type of suitable imaging camera that acquires and records serial images or video on either analog or digital recording media, and wherein the recorded serial images or video, both of which are encompassed in the terms "video footage" and "camera footage," are associated with recorded metadata.

It is also noted that the term DVR normally refers only to the recorder that records the camera footage on digital media. The DVR is operatively connected to an imaging (camera lens) unit, also referred to herein as the "viewing lens" portion of the video camera. It is the viewing lens that actually views a scene. The term "camera" and "video camera" are used interchangeably herein, unless otherwise indicated, to refer to the entire unit comprising both the viewing lens and the recorder that records and stores the images to video media. The DVR and viewing lens portion are usually located within close proximity to each other, at the same location.

FIGS. 1-15 assume that the DVR and the viewing lens are at the same location. However, in embodiments in which the recording unit or DVR may be located remotely from the viewing lens, the app 208 is configured to allow a user to enter a location for the viewing lens (which is the location used to identify cameras which may have viewed the incident of interest) and a different location for the DVR and the recorded footage. Knowing where to retrieve evidentiary footage in such cases will save investigators valuable time.

Referring to FIGS. 1-15, various screens 10 of an exemplary app can be viewed on a display 220 of a mobile device 202. Three main functions of the app 208 are preferably directly accessible from most screens, via virtual buttons, for example, once a user has accessed the app: a calculator button 12, a DVR List button 14, and a Profile button 16.

Figure 13:
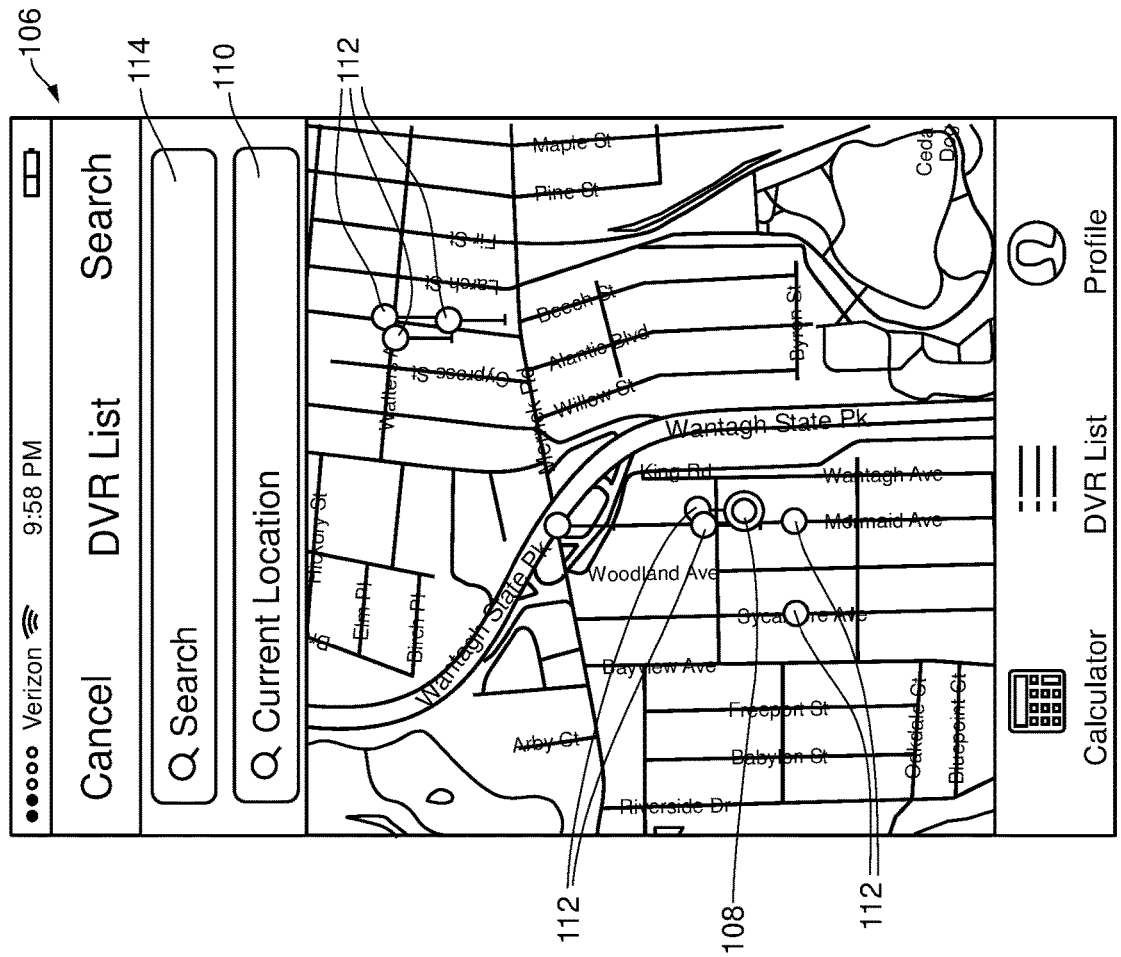
FIG. 13 represents a screen shot of a map view showing locations of DVR's generated by the app.

As shown in FIGS. 1-4, e.g., a user can access and scroll through a "calculator screen" 18 providing the functionality of a date and time calculator, for example, by pressing the calculator button 12. The calculator screen 10 may be accessed to quickly calculate the correction (at 248, FIG. 21, e.g.) and synchronize video footage for a camera already in the database, which may be easily identified, e.g., from a map view 106 (see FIG. 13) generated by integrating the camera location details over the map via mapping module 228, e.g., or by entering a location in box 20, as shown in FIG. 13, or for a new camera not yet stored in the database 203 and to synchronize video footage. If the camera details are already stored in the database 203, once a user locates it from a map view 106, and clicks on the camera location, or by adding the location in box 20 directly in the calculator screen 18, all previously stored data is automatically loaded into the user screen. At this point, upon identifying the camera of interest stored in the database based on location, the app 208 loads all stored details, including the correction, which is loaded into boxes 30 and 32 as a difference in days 30 and hours 34 (see FIG. 3), and the user only needs to enter the date and time of an incident of interest, which the user wishes to locate on the DVR footage, in box 26 (see FIG. 2). The adjusted date and time may then be automatically calculated in response to entering the data, or in embodiments, in response to clicking a calculate button 28, and are displayed as the adjusted or "Go To" date, in box 34 and time, in box 36 (FIG. 3).

In embodiments, the user may also access the calculator screen 18, and not enter any location data—either manually or automatically—and instead, only enters a current, actual date and time in box 22, the observed DVR date and time (metadata) in box 24 (see FIG. 1), and the incident date and time in box 26. Upon entering the data, or in response to clicking the calculate button 28, the correction (boxes 30 and 32) and the adjusted date and time in metadata (boxes 34 and 36) are automatically calculated and loaded into the appropriate boxes displayed on the calculator screen 18.

As described supra, e.g., in reference to FIG. 22, step 250, in embodiments, the current, actual date and time that coincides with the user's entering the metadata in box 24 for any camera may be automatically imported via a date/time stamp acquired, e.g., via a GPS or cellular network or other reliable source accessible to the app 208 on the user's mobile device 202.

From the calculator screen 18, the user may also enter an address 20 where the camera of interest is located. Optionally, no address is entered, and a location is automatically input using geolocation data retrieved from the mobile device, e.g., via location module 224.

It is noted that for any one or more of the automatic locating and automatic time/stamp options described herein, an embodiment of the app 208 may provide a toggle next to the relevant data box on the screens that allows either manual entry by the user, or by enabling the toggle, automatically imports current data based on the user device's current location and on the current actual date/time.

Referring again to FIG. 2, which may be viewed by scrolling down the calculator screen 18, any data may be input by the user via a virtual keyboard, for example, displayed on the mobile device, including:

Current Date and Time 22

DVR Date and Time 24—the date and time currently shown on the DVR

Incident Date and Time 26—the date and time of the incident to be located on the DVR footage Referring to FIG. 3, as describe supra, calculate button 28 may be provided on the screen 18. In embodiments, in response to the user pressing "calculate" 28, and based on the details 22, 24, 26 input by the user, the app 208 calculates and displays:

Difference in Days 30

Difference in Hours 32

Go to Date 34 (the adjusted date to turn the DVR to, to locate and view the incident)

Go to Time 36 (the time to turn the DVR to, to locate and view the incident)

In embodiments, the calculation will optionally, or additionally, be automatically performed and the results 30, 32, 34, 36 automatically filled in on the screen 18, in response to the user properly entering all the details 22, 24, 26 needed for the calculation by hitting a virtual return or tab key, for example.

Any time the user accesses a camera from the database and updates any of the details, and anytime the user adds details for a newly added camera, the app 208 preferably updates the database 203 accordingly, e.g., with the location of the DVR, and the calculated difference in days 30 and time 32. The user may also simultaneously add the camera(s) to a user DVR List (see FIG. 10, e.g.), which may also be stored with the database 203 in remote storage 204, but which is also preferably associated with a unique user ID and/or a case number so that the user can input and track all cameras related to a particular incident, investigation, or case. The location information and data needed to calculate the adjusted day and time also preferably automatically fill in a DVR Details Screen 42 as further described in reference to FIGS. 5-9 below, the entire contents of which are stored in the database 203.

A reset button 38 may also be provided on the calculator screen 18 which, when pressed, resets or clears the details entered by the user as well as the calculated results.

Once data is entered via the calculator screen 18, as shown in FIGS. 4A-4B corresponding to FIGS. 1-2, respectively, calculations are preformed (as shown in FIG. 4C, corresponding to FIG. 3) for a DVR located at an address entered by the user (or obtained automatically via the mobile device's geolocation capability) to determine the date 34 and time 36 the user should turn this particular DVR to, to locate and view the incident of interest, or relevant information related thereto, assuming the DVR actually captured footage that is useful to the user.

Referring to FIG. 5, on scrolling further down the calculator screen 18 in the embodiment shown, the user can add additional useful details for storage to a DVR Details table and/or database by pressing an "Add DVR Details" button 40, for example, which accesses and displays an editable "DVR Details" 42 screen. Details can be entered, including but not limited to: the building name where the DVR is located; further details about DVR location; building phone number; individual contact person name and phone number; DVR make, model, length of time it can record; whether the cameras' viewing lens are interior or exterior; whether camera is operable; and additional investigator's notes.

FIGS. 6-10 describe several ways a user may enter, edit and view additional details for a new or existing camera for storage in the database 203 and in other user-accessible lists, which can then be accessed for identifying and synchronizing cameras relevant to a particular investigation.

As shown in FIGS. 6A-6C, an editable DVR Details screen 42 allows the user to add, as well as edit, information about a particular DVR. Such information can include, but is not limited to, any one or more of the following:

Name of the location 44 (or a shorthand name could also be assigned).

Location information 46—will preferably automatically plug in based on address entered on the calculator screen; can also edit.

Phone number 48

Contact Information 50 which may include
Contact Name 52 and/or
Contact Phone Number 54
DVR information 56
DVR make and model 58
Length of time recorded 60 (how long is the video stored on this DVR)
Location 45, if different than the location 46 corresponding to the viewing lens of the video camera
3 check off boxes for future reference 62
Camera not operable 64
Exterior Cameras 66
Interior Cameras 68
Date that data was last acquired to synchronize the camera
Notes 70: The calculations will preferably automatically plug into the notes section 70. A user can type in any notes under the calculations, storing both, or may clear the calculations by deletion or pressing a "clear" button 72.

When the user has completed entry of data in all the fields relevant to the information the user wishes to save, as shown for example in FIGS. 7A-7C corresponding to FIGS. 6A-6C, respectively, the user can press a "Done" button 74. The editable DVR Details screen 42 also may include (on the top of the screen in this example), a cancel button 76 providing the option to cancel entry of additional details.

Figure 10:
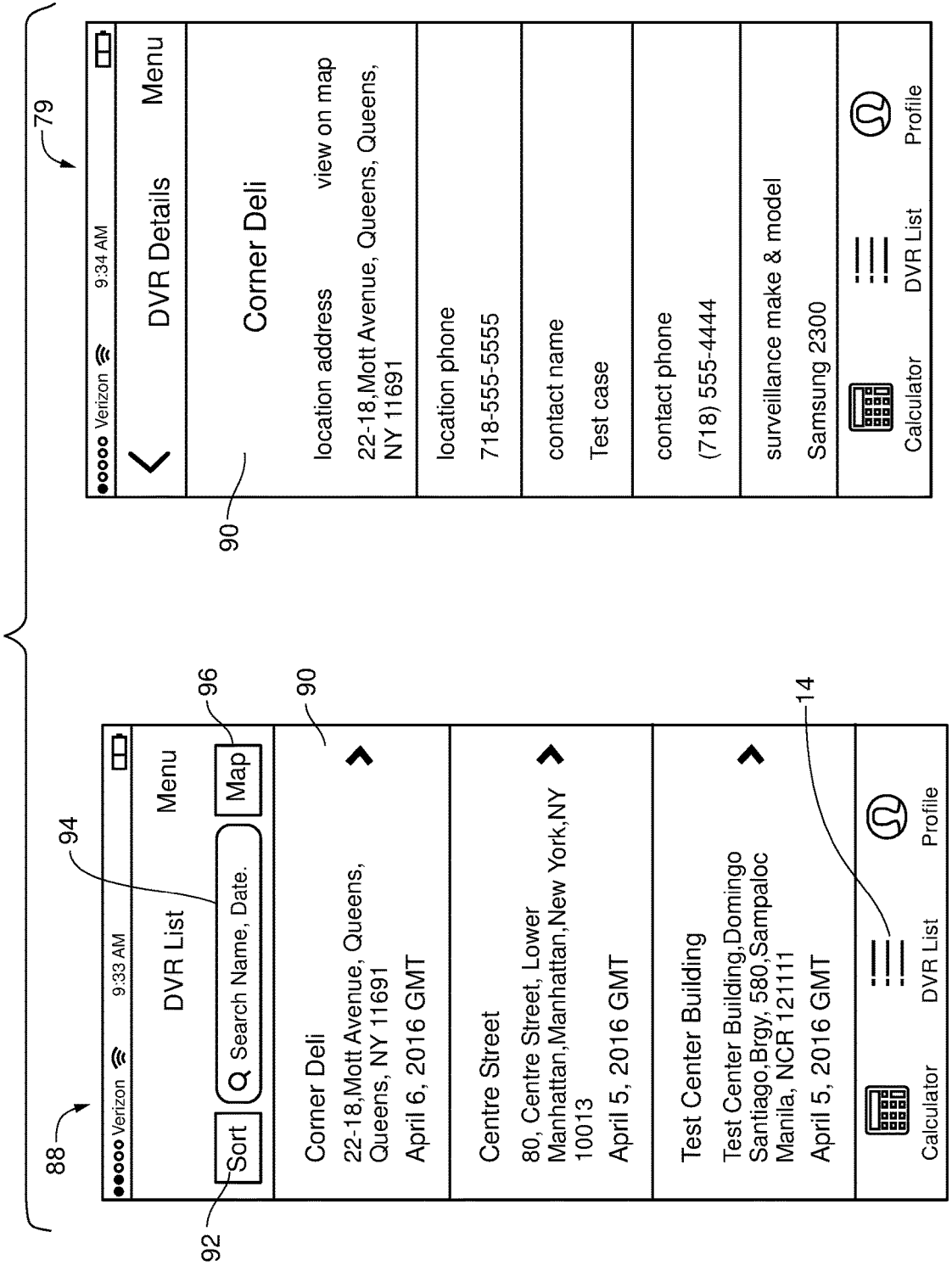
FIGS. 10-12 represent screen shots of a DVR List screen generated by the app.

Referring to FIGS. 7A-7C, once the details are saved, by pressing Done 74, for example, the DVR information recorded in the fields of the editable DVR Details screen 42 is automatically displayed on a DVR Details screen 78, and may also be automatically exported to the user's current DVR List 88 (see FIG. 10, e.g.).

The DVR Details, once saved by selecting "Done" are shown on a saved DVR Details screen 79, which also includes a Menu button 80. After pressing Done 74, for example, the user may review the saved DVR Details information for accuracy. If further edits are needed, as shown in FIG. 8, the user can press the Menu button 80 to display a Menu screen 82, which in turn provides an Edit option 84 for accessing the editable DVR Details screen 42. Additional options on the Menu may include, without limitation, adding a calculation 103 (if camera is added anew and then calculations performed, e.g.), export button 104 to export the DVR Details to a database; and/or a delete button 105 to delete the DVR.

From the DVR Details screen, there is also an option to "view on map" 85 which, when selected by the user, displays a map screen (FIG. 9) showing the location of the DVR using the location data 46.

Referring to FIG. 10, a DVR List 88 may be displayed by pressing the DVR List button 14, which is accessible from at least the main screens displayed by the app.

After a user has completed the DVR details, the DVR information is preferably automatically stored in the database 203, and to the user's DVR List 88 of all DVR's a user has ever entered and stored. In embodiments, the DVR List 88 also includes DVR's entered and stored by other users with whom the user has opted to share the information, or with other users associated with a group having shared access as determined, e.g., by an administrator.

Any one of the DVR's full details may be displayed in the corresponding DVR Details screen 78 for a DVR when the DVR is selected from the List 88, by the user touching or pressing a virtual selection button, arrow, or the DVR name, for example. As described supra, the location of the selected DVR 90 can then also be viewed on a map by selecting a "view on map" button 85, for example, from the completed DVR Details screen 78.

In other embodiments, in addition to the camera details described above, the database 208 may also store for each camera actual views and camera angles, allowing the user to see the camera coverage of a specific area. Accordingly, when a camera is selected from a DVR List, for example, in addition to the details, and the map view, a representative camera view representative of the video coverage is also stored and available for viewing by a user, showing the camera view on a map.

FIGS. 10-16 describe several ways a user may implement an embodiment of the app 208 to locate, sort, search, filter, export, and otherwise access the database 203 for quickly identifying, locating and synchronizing camera footage relevant to a particular investigation.

Referring to FIGS. 10 to 13, in the embodiment shown, the DVR List screen 88 includes three options for performing the following additional functionalities: a sort, a search, and a map function via a sort button 92, search bar 94 and a map button 96, for example.

To sort the list of DVR's, the sort button 92 is selected by the user. The user may select an option for sorting by, e.g.: the date 98 the DVR was added, for example, from most recent to the oldest; or by distance 100. The sort by distance function 100 may include at least the following options:

1. Enter no address and the list will sort based on the user's current location, which may be automatically detected via GPS location of the user device
    a. Preferably will list closest location to the user's current location first; or
2. Enter an address in the search bar 94 and select sort by distance 100
    a. This will sort the list with all DVR's within a predetermined distance selected by the user, e.g., a ½ mile of the location entered.
    b. The list will preferably sort from the closest to the location entered, to the furthest.

Figure 14:
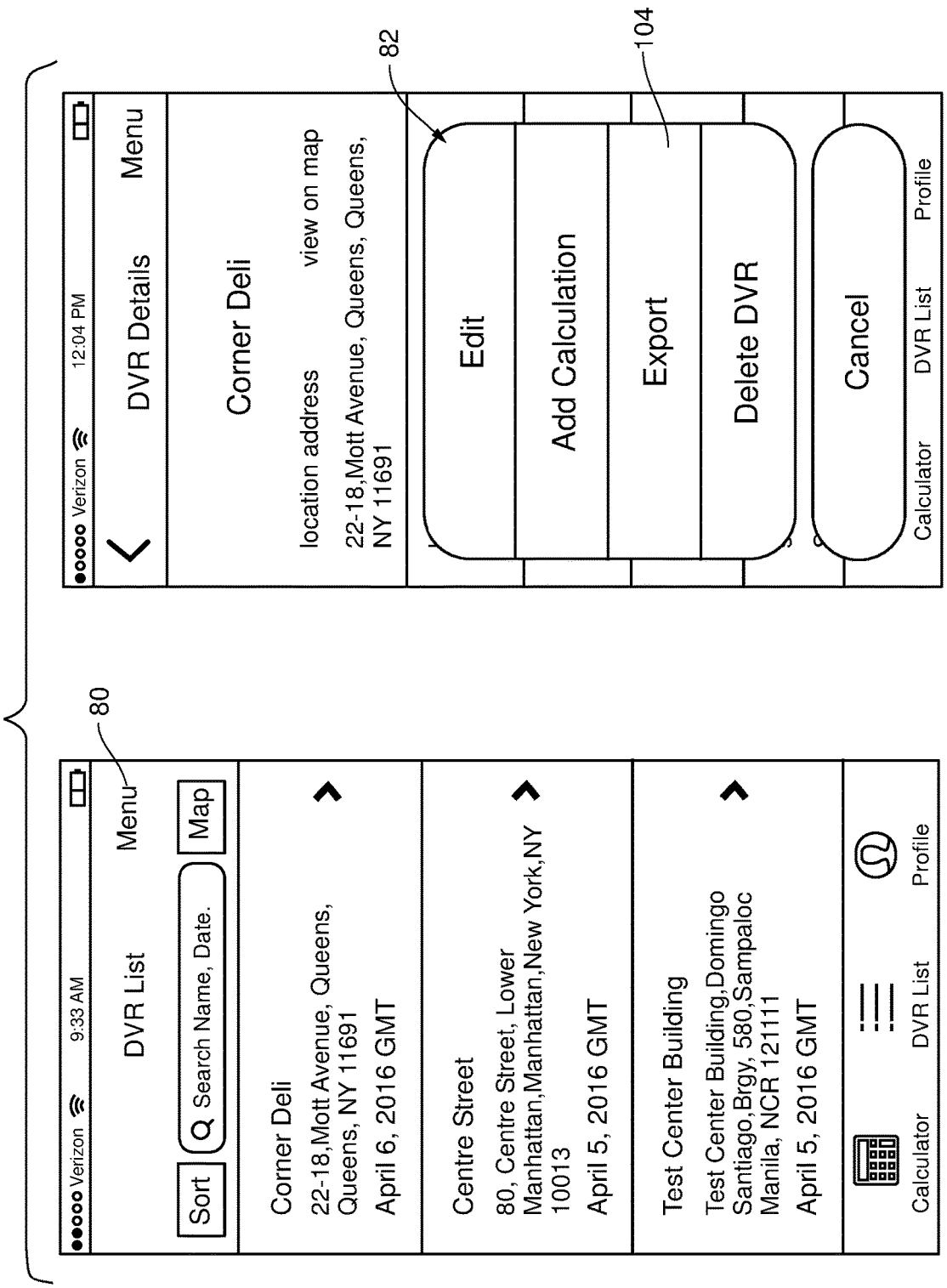
FIGS. 14-15 represent screens generated by the app for exporting DVR Lists and reports.

To search the list of DVR's, identifying information is entered in the search bar 94 by the user. The search may be initiated by pressing a virtual return button or pressing a search button 102. For example, the user may enter text to search by any of the fields of details entered in the DVR List, including but not limited to:

Camera Operable
Date added/entered
Date Last synched
Name
Address
Zip Code
Key words Referring to FIG. 14, the results of any search may be compiled in a list and exported, in embodiments, by selecting the Menu option 80 to open the Menu 82 and then the export button 104.

Referring also to FIG. 22, embodiments of the method of the disclosure may be implemented via the mapping functionality via the user device 202 to assist the user in quickly identifying relevant cameras based on their location relevant to the incident. When the user elects the map button 96 from the DVR List screen 88, a map is generated on a map screen 106 (FIG. 13) of the user's current location 108 as well as the location of all the DVR's 112 in the DVR List within the displayed map area. The current location may be automatically filled in on a text bar 110 from the most recent data entered by the user, or automatically filled in from geolocation data provided by the mobile device.

Figure 11:
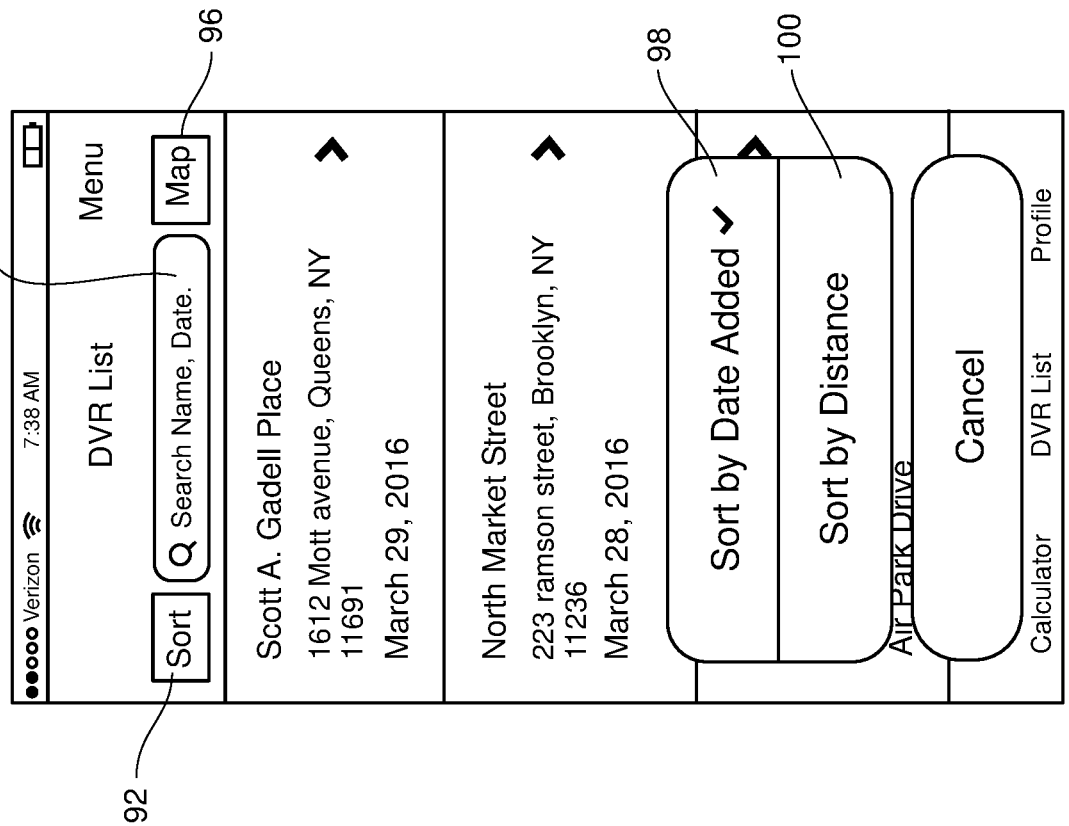
Figure 12:
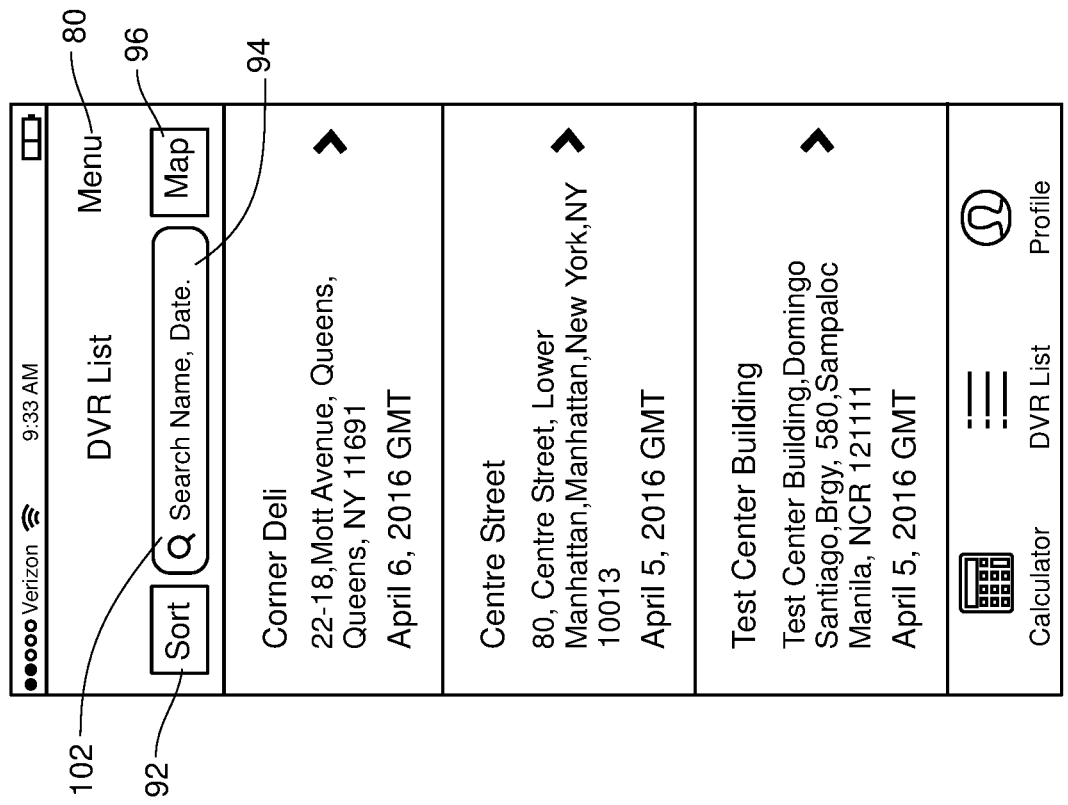

In addition, any location, such as a location relevant to an incident of interest, may be filled in manually in a search text bar 114 in order to identify DVR's around the location entered in the text bar 114 which may have captured relevant footage, and to view the DVR's on the map. Accordingly, the method includes generating, at 252, via the app, a map of an area that includes the incident location, and displaying the map, at 252, on the user device, which is operatively connected to the database. The method further includes populating the map, at 256, with graphical elements, such as pins, indicating the locations of cameras from the database that are located within a selected area around the incident location. In yet another embodiment, a pin may be dragged and dropped by the user, at 264, onto the location of interest; the closest address is then used to fill in box 114. The cameras identified as being relevant, based on their location to the location relevant to the incident, indicated in box 114 and on the map 106, may include all cameras that are located within the area displayed on the map, at 258, or may be an area selected in accordance with a user-defined distance, at 262, from the incident location 114 that can be entered (box not shown), e.g., via either the map screen 106 or sorting screen (FIG. 11). In other embodiments, the cameras identified for synchronizing and examining footage are those within a bounded region, which is "drawn" by the user, at 260, on the map via the display in the user device.

A graphical element is also used, at 254, to indicate the location of interest, e.g., the incident location on the map. In embodiments, different graphical elements may be used, at 256, to differentiate the location of the incident, for example, from the location of cameras within a user-selected area around the incident. The graphical elements may be the same type of graphical element but differentiated by color, and/or may be different symbols or shapes, for example. The DVR's may be marked by "pegs" or circles shown on the map and may be color-coded. For example, a blue peg could be used to view the current location, a green peg could be used to view the location of interest entered in the search bar, and red pegs may be used to show the location of the DVR's relative to the current location 108 or to the location manually entered in the search bar 114.

In embodiments, any of the details associated with the cameras may also be displayed, for example, superimposed on, or highlighted on the map screens for each camera indicated on the map. In other embodiments, the map screen 106 may display any one or more of the details associated with the DVR's 112 in the DVR List, without leaving the map view, when the user hovers over one of the pegs marking the location of a particular DVR, for example. In another embodiment, the user can select an option to only show, or to highlight, DVR's from the DVR List in the map view that meet some additional criteria. For example, in embodiments, the user can elect to omit from the map view those cameras that are currently flagged as not operable (see FIG. 6B, Camera Not Operable Toggle 64). Identifying cameras that are not operable will expedite the investigation, and not waste time looking for unreliable footage.

In other embodiments, the DVR's identified in accordance with any of the user-selected location criteria in relation to the location of the incident (in box 114, e.g.) described herein using the map functionality of the app 208 may be exported into a list of DVR's associated with the particular incident or case. The list may be filtered according to any of the details of the cameras stored in the database. In addition, toggles such as "camera inoperable" may be visibly highlighted in any suitable graphical form, to flag on the map, which of the identified cameras will not have any reliable evidence and need not be pursued.

In additional embodiments, the map screens are integrated with GOOGLE® earth so that images of the actual locations ("street views") of the cameras in the DVR List can also be seen.

Figure 15:
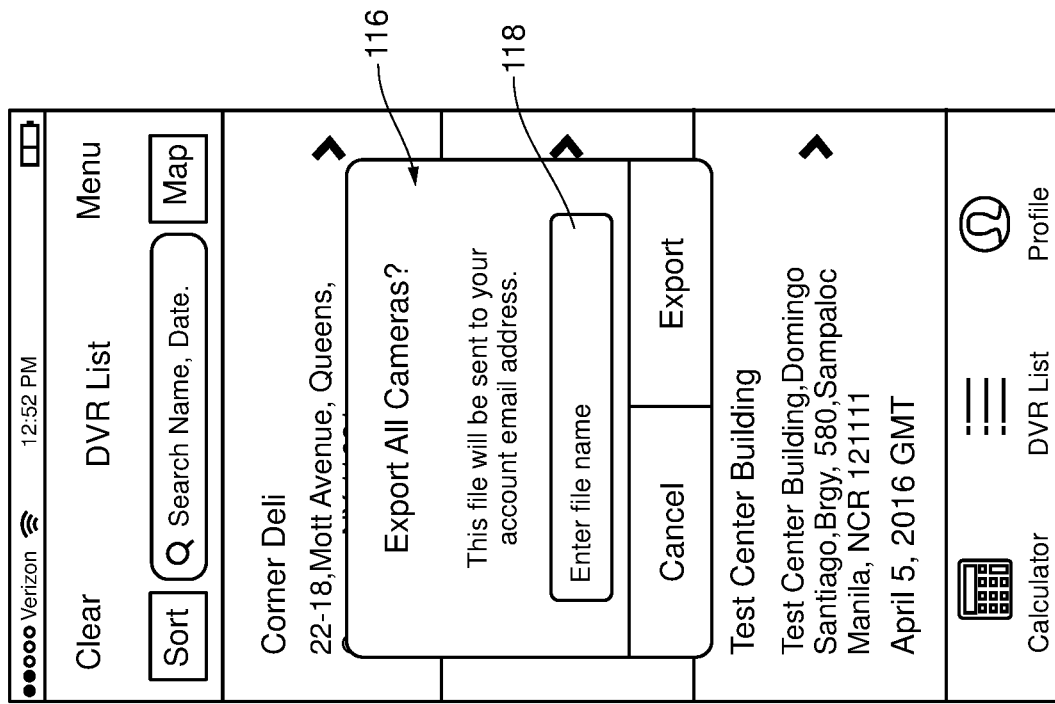

Referring to FIGS. 14-16, the user can export the entire DVR List available, or any filtered list, e.g., the list of cameras identified based on their relative location to the location of the incident of interest (which may be determined via the mapping functions described supra), by selecting an export button 104 from the Menu screen 82. Another naming screen 116 may be displayed when the export button 104 is selected to allow the user to enter a file name 118 for a report, which may be in excel format, for example, comprising the DVR List. The report can then be emailed to an account on file for the user, printed, and/or saved. An example of the report that may be generated is provided in FIG. 16. Preferably, the report is generated in an excel format or other searchable and sortable file type, and, referring also to FIGS. 1-3, and 6A-6C, contains all entered data and automatically imported data, including location name 44 and address 46 of the camera, contact details such as contact name 52, contact telephone number 54, camera details such as make and model 56, length of time recorded 60, and status 64 (operable or not) and whether there are exterior cameras 66 and/or interior cameras 68 at that location 46, and all entered and calculated data 55 (current date and time 22; DVR Date and Time shown 24; calculated difference in days 30 and hours 32) needed to properly locate footage recorded on each camera corresponding to an actual date and time of an incident 26, along with the adjusted date 34 and time 36 to turn the DVR to, to locate and view the incident occurring at the actual date and time 26. FIG. 16 is one example of a report. Reports may be customized by the user to include any selected details for each camera in a list, or filtered list.

In various embodiments, a user may log in to an app or to a website providing the functionality described herein. Upon purchase of the app or access to the website, the user provides identifying information to set up a login account, which may be password-protected. The identifying information may also be used to perform various administrative functions, particularly related to building a database of the camera data input by users and the calculations generated by the program. The data may be made accessible to users based on read/write privileges associated with each camera, and on membership of a user requesting access in a particular group. For example, all data entered for all cameras in the database may be made available to any user logging in as a member of a group associated with a particular law enforcement agency. In another example, users may be part of a community watch group having access only to camera data that is input by members of the community watch group.

The database 203 corresponding to the DVR list associated with any such group is preferably accessible via the internet to users having the prerequisite privilege, and may be maintained in the cloud, such that each user can share his/her list to others, if authorized. An option may be provided to subscribe to the list/directory based on area (by zip code or city/state or neighborhood, and so on).

A user may be prompted on first use of the app or program to enter a login name or other identifier (ID), which may be an email address, for example, and then to enter a password for access to the app and database. Identifying information may include:
First Name
Last Name
Email Password
Location: City, State, Zip Code
Occupation
Agency
Phone Number (Optional)

FIGS. 17 and 18 provide examples of screens through which various administrative functions are made available to an administrator of the users and database associated with the app. An administrator panel of users 120 is shown in FIG. 17, from which the administrator can view a list of all users by any of the various identifying information, such occupation, agency (which may be used to set group access privileges), location, email address, and phone number. Functions are provided to search 122 by any keyword or other criteria and to export 124 the entire list, or the filtered list associated with the search criteria or keyword, if entered. The list may be in excel or any other suitable file format, such as a PDF file, or word file, rtf, and so on. An upload function 126 may also be provided to allow the administrator to upload the entire or filtered list to a user's account.

An administrator panel of DVR's 130 in a DVR List is shown in FIG. 18, from which the administrator can view a list of all DVR's (or other cameras) for which data has been entered by all users of the app or website service, or by any selected group of users associated with a group, and which may be exported by selecting an export button 132, for example, in full, or filtered be any search criteria or keyword entered in the search bar 134. The exported list of DVR's may be in excel or any other suitable file format, such as a PDF file, or word file, rtf, and so on. The list, like the other lists and reports that can be generated by the app, may be sent directly to an administrator email account, or to a user email account selected by the administrator, and may also be printed and/or saved.

The exported list of all DVR's preferably contains the username or ID of the user who entered the DVR and the date the record was created by the user, and also preferably contains all of the details entered by users and generated by the app, including:
Location name, address, phone #
Contact name, and phone #
Operable, exterior, or interior cameras
Make/model, length of time recorded In additional embodiments, a file, such as a .csv file, containing properly formatted records of DVR data can be uploaded into the database 203 associated with the app or program or into any other database, and may be further identified with a case number or other identifier to limit access.

In additional embodiments, the method may include options to tailor the use of the app (or other software program implementing the method of the disclosure) to a particular group, such as law enforcement. Accordingly, additional options may be provided to: enter case numbers; enter photographs, for example, of a street or sidewalk view, or other camera views from the DVR. Additional options may include to: upload DVR List and/or Details, and/or video footage taken from selected DVR's to a directory, which may be in the cloud.

In embodiments, the video footage saved for an identified list of cameras identified as relevant to an incident, based on location, may be automatically and, optionally, simultaneously cued using the correction to the metadata, to the actual date and time of the incident. In various embodiments, the synchronized footage from several cameras may be displayed side-by-side on a single monitor for comparison.

Various embodiments may include adding more details saved for the cameras in the List and database. For example, instructions on how to download video from the listed DVR may be included.

The system and methods provided herein advantageously reduce the risk of missing vital camera footage during a canvass of a crime scene, reduce human error that would otherwise occur in calculating and manually entering corrected date/time data, generated verifiable documentation for use at trial, significantly reduces investigative time in gathering and reviewing evidence, particularly in locating relevant and reliable camera footage, and assists in developing new leads with targeted deployment.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A method for synchronizing camera footage from a plurality of cameras, the method comprising:
   providing a database associated with a plurality of cameras, accessible via a user device, wherein the database includes a correction associated with each of the plurality of cameras to at least one of a date and a time in metadata associated with footage recorded by the corresponding camera, to facilitate synchronization of the footage recorded by each of the plurality of cameras to an actual date and time;
   applying, by a processing device, the correction stored in the database associated with at least one camera of the plurality of cameras to determine at least one of an adjusted date and an adjusted time in the metadata for the at least one of the plurality of cameras corresponding to footage recorded at a particular date and time; and
   synchronizing, by the processing device, the footage of the at least one of the plurality of cameras to the particular date and time, based on the at least one of the adjusted date and the adjusted time determined from the correction to the metadata stored in the database for the at least one of the plurality of cameras.

2. The method of claim 1, further comprising cueing the footage of the at least one of the plurality of cameras to the particular date and time.

3. The method of claim 1, further comprising
   receiving, by the processing device, for the at least one camera, the actual date and time, and the date and the time in the metadata associated with the footage recorded by the at least one camera at the actual date and time;
   determining, via the processing device, the correction associated with the at least one camera; and
   storing and associating, via the processing device, the correction associated with the at least one camera.

4. The method of claim 1, further comprising displaying on a screen operatively connected to the processing device, the at least one of the adjusted date and the adjusted time in the metadata for synchronizing the footage of the camera to the particular date and time.

5. The method of claim 1, further comprising storing and associating, by the processing device, details associated with each of the plurality of cameras, the details including location details including a geographical location associated with each camera in the database.

6. The method of claim 5, further comprising identifying, by the processing device, the at least one camera for applying the correction, based on a proximity of the geographical location associated therewith to a particular location.

7. The method of claim 5, further comprising adding, via the processing device, one camera to the database, and storing and associating, via the processing device, details associated therewith, wherein the details stored and associated for the one camera include the actual date and time and at least one of an observed date and an observed time in the metadata coinciding with the actual date and time, wherein the at least one of the observed date and the observed time are received via user input to a user device operatively connected to the database, the method further including:
   calculating, for the one camera, the correction to the metadata to synchronize the footage for the one camera based on the at least one of the observed date and the observed time recorded by the one camera coinciding with the actual date and time; and
   associating the one camera with the corresponding correction and storing the corresponding correction in the database.

8. The method of claim 7, wherein the actual date and time for the one camera is automatically imported via the user device from one of a cellular network and a GPS date/time stamp coinciding with the observed date and the observed time in the metadata.

9. The method of claim 7, wherein storing and associating further includes automatically importing the geographical location for the one camera co-located with a user device based on GPS location data for the user device.

10. The method of claim 5, wherein the details of each of the plurality of cameras in the database further include at least one of a camera operable indicator, the flag indicating one of operable and not operable status, contact information, a make and model of the corresponding camera, a date the corresponding camera was entered into the database, and a date the corresponding camera was last synchronized.

11. The method of claim 6, wherein the at least one camera is a list of cameras, the method further comprising identifying, by the processing device, the list of cameras from the plurality of cameras based on the proximity of the geographical location of each camera to the particular location, wherein the details of each camera in the list of cameras includes the location, the correction, and the at least one of the adjusted date and the adjusted time in the metadata associated with each corresponding camera in the list of cameras.

12. The method of claim 11, further comprising exporting, by the processing device, the list of cameras and the details associated therewith to at least one of a file and an email account associated with a user ID.

13. The method of claim 11, the method further comprising:
   generating a map of an area that includes the particular location, and displaying it on a user device operatively connected to the database;
   indicating the particular location on the map with a first graphical element; and
   wherein identifying the list of cameras further includes populating the map with a plurality of second graphical elements indicating the geographical location of each of the plurality of cameras within a selected area around the first graphical element, each camera located within the selected area corresponding to one camera on the list of cameras.

14. The method of claim 13, wherein the selected area is the area of the map displayed on the user device.

15. The method of claim 13, wherein the selected area is a bounded region graphically defined by user input via the user device.

16. The method of claim 15, wherein the bounded region is defined by a user-defined distance from the particular location.

17. A system for synchronizing camera footage from a plurality of cameras, the system comprising:
- a processing device;
- a database operably connected to the processing device, wherein the database includes a correction associated with each of a plurality of cameras to at least one of a date and a time in metadata associated with footage recorded by the corresponding camera, to facilitate synchronization of the footage recorded by each of the plurality of cameras to an actual date and time; and
- a storage device for storing instructions that, when executed by the processing device, perform operations comprising:
  - applying the correction stored in the database associated with at least one camera of the plurality of cameras to determine at least one of an adjusted date and an adjusted time in the metadata for the at least one of the plurality of cameras corresponding to footage recorded at a particular date and time; and
  - synchronizing the footage of the at least one of the plurality of cameras to the particular date and time, based on the at least one of the adjusted date and the adjusted time determined from the correction to the metadata stored in the database for the at least one of the plurality of cameras.

18. The system of claim 17, wherein the storage device includes further instructions that, when executed by the processing device, perform further operations including receiving, for the at least one camera, the actual date and time, and the date and the time in the metadata associated with the footage recorded by the at least one camera at the actual date and time, determining the correction associated with the at least one camera, and storing and associating the correction with the at least one camera in the database.

19. The system of claim 18, further comprising a screen operatively connected to the processing device, wherein the storage device includes further instructions that, when executed by the processing device, perform further operations including displaying on the screen the at least one of the adjusted date and the adjusted time in the metadata for synchronizing the footage of the camera to the particular date and time.

20. The system of claim 19, wherein the database further includes details associated with each of the plurality of cameras, the details including location details including a geographical location associated with each camera in the database, and wherein the at least one camera is a list of cameras, wherein the storage device includes further instructions that, when executed by the processing device, perform further operations including:
- generating a map of an area that includes an incident location, and displaying it on the screen operatively connected to the processing device;
- indicating the incident location on the map with a first graphical element; and
- identifying the list of cameras from the plurality of cameras for applying the corresponding correction based on the location of each of the plurality of cameras relative to the incident location, wherein identifying further includes populating the map with a plurality of second graphical elements indicating the geographical location of each camera from the database within a selected area around the first graphical element, each camera located within the selected area corresponding to one of the plurality of cameras.

* * * * *